US011847827B2

(12) United States Patent
Han et al.

(10) Patent No.: US 11,847,827 B2
(45) Date of Patent: Dec. 19, 2023

(54) DEVICE AND METHOD FOR GENERATING SUMMARY VIDEO

(71) Applicant: Samsung Electronics Co., Ltd., Suwon-si (KR)

(72) Inventors: Junkyu Han, Suwon-si (KR); Pius Lee, Suwon-si (KR); Hyunuk Tak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 17/372,276

(22) Filed: Jul. 9, 2021

(65) Prior Publication Data
US 2022/0012500 A1 Jan. 13, 2022

(30) Foreign Application Priority Data

Jul. 9, 2020 (KR) .......................... 10-2020-0084936

(51) Int. Cl.
G06V 40/00 (2022.01)
G06V 20/40 (2022.01)
(Continued)

(52) U.S. Cl.
CPC .............. G06V 20/47 (2022.01); G06V 40/10 (2022.01); G06V 40/20 (2022.01); G10L 25/57 (2013.01); G10L 25/63 (2013.01)

(58) Field of Classification Search
CPC ......... H04N 21/8549; H04N 21/44218; H04N 21/4667; G06F 16/7837; G06F 16/739;
(Continued)

(56) References Cited

U.S. PATENT DOCUMENTS 9,106,958 B2 * 8/2015 el Kaliouby ......... H04N 21/251
9,165,556 B1 * 10/2015 Sugar ...................... G10L 15/08
(Continued)

FOREIGN PATENT DOCUMENTS

JP 2007-097047 A 4/2007
JP 2019-068300 A 4/2019
(Continued)

OTHER PUBLICATIONS

International Search Report and Written Opinion of the International Searching Authority in connection with International Application No. PCT/KR2021/008332 dated Oct. 8, 2021, 8 pages.
(Continued)

Primary Examiner — Molly Wilburn
Assistant Examiner — Ahmed A Nasher

(57) ABSTRACT

A method for generating a summary video includes generating a user emotion graph of a user watching a first video. The method also includes obtaining a character emotion graph for a second video, by analyzing an emotion of a character in a second video that is a target of summarization. The method further includes obtaining an object emotion graph for an object in the second video, based on an object appearing in the second video. Additionally the method includes obtaining an image emotion graph for the second video, based on the character emotion graph and the object emotion graph. The method also includes selecting at least one first scene in the second video by comparing the user emotion graph with the image emotion graph. The method further includes generating the summary video of the second video, based on the at least one first scene.

20 Claims, 13 Drawing Sheets

(51) Int. Cl.
*G10L 25/63* (2013.01)
*G10L 25/57* (2013.01)
*G06V 40/10* (2022.01)
*G06V 40/20* (2022.01)

(58) Field of Classification Search
CPC ....... G06T 11/206; G10L 25/63; G10L 25/57; H04H 60/33; G06V 20/47; G06V 40/10; G06V 40/20
See application file for complete search history.

(56) References Cited

U.S. PATENT DOCUMENTS

| | | | |
|---|---|---|---|
| 9,654,845 B2 | 5/2017 | Yoo et al. | |
| 10,455,297 B1 | 10/2019 | Mahyar et al. | |
| 2015/0378544 A1 | 12/2015 | Shahraray et al. | |
| 2017/0124400 A1 | 5/2017 | Yehezkel Rohekar et al. | |
| 2018/0075490 A1 | 3/2018 | Chintalapoodi et al. | |
| 2018/0075876 A1 | 3/2018 | Chintalapoodi et al. | |
| 2020/0175066 A1 * | 6/2020 | Li | G06F 16/738 |
| 2020/0280752 A1 | 9/2020 | Park et al. | |
| 2020/0327327 A1 * | 10/2020 | Wu | G06V 30/19173 |

FOREIGN PATENT DOCUMENTS

| | | | |
|---|---|---|---|
| KR | 10-1341808 B1 | 12/2013 | |
| KR | 10-1838792 B1 | 3/2018 | |
| KR | 10-2019-0056679 A | 5/2019 | |
| KR | 10-2072022 B1 | 1/2020 | |
| WO | WO-2021058116 A1 * | 4/2021 | ........... G11B 27/034 |
| WO | WO-2021151485 A1 * | 8/2021 | ........... G06F 16/739 |

OTHER PUBLICATIONS

Microsoft Cognitive Services, "Face API-v1.0," 2017, 4 pages. https://westus.dev.cognitive.microsoft.com/docs/services/563879b61984550e40cbbe8d/operations/563879b61984550f30395236.

* cited by examiner

DEVICE AND METHOD FOR GENERATING SUMMARY VIDEO

CROSS-REFERENCE TO RELATED APPLICATION

This application is based on and claims priority under 35 U.S.C. § 119 to Korean Patent Application No. 10-2020-0084936, filed on Jul. 9, 2020, in the Korean Intellectual Property Office, the disclosure of which is incorporated by reference herein in its entirety.

BACKGROUND

1. Field

The disclosure relates to a device and method for generating a summary video, and more particularly, to a device and method for generating a summary video based on a user's tendency.

2. Description of the Related Art

With the development of network technologies and data processing technologies, the amount of multimedia data provided to users has sharply increased. Thus, to efficiently guide a lot of video content to users, summary contents including major scenes of the video content have been provided to the users. In particular, service providers directly edit important or interesting highlight scenes in the video content in the form of short video clips and generate summary videos.

Recently, as various video-on-demand (VOD) and streaming video services are increasing and video content and a way to view the video content are diversified, the users prefer viewing video content based on interest or a level of interest over an existing way in which the users are provided with video content unilaterally.

Hence, a summary technique is required for efficiently analyzing individual user's emotions and briefly and rapidly delivering information about video content preferred by the users.

SUMMARY

Provided are a device and method for generating a summary video of a second video based on emotions of a user watching a first video and emotions of characters appearing in the second video.

Also, provided are a device and method for generating a summary video, in which emotions related to a character, an object, a background, a sound, and a line in the second video are compared with emotions of the user watching the first video to provide the summary video of the second video to the user who watched the first video.

In addition, provided are a device and method for generating a summary video, in which an image emotion graph based on character emotions and object emotions for the second video is compared with a user emotion graph for the first video to select a first scene to be included in the summary video.

Moreover, provided are a device and method for generating a summary video, in which a second scene to be included in the summary video is selected based on emotion scores in an image emotion graph for the second video.

Additional aspects will be set forth in part in the description which follows and, in part, will be apparent from the description, or may be learned by practice of the presented embodiments of the disclosure.

According to a first aspect of the disclosure, there is provided a method, performed by a device, of generating a summary video, the method including obtaining a user image in which a user watching a first video is photographed, during playback of the first video, generating a user emotion graph of the user watching the first video, by analyzing an emotion of the user in the obtained user image, obtaining a character emotion graph for the second video, by analyzing an emotion of a character in a second video that is a target of summarization, obtaining an object emotion graph for an object in the second video, based on the object appearing in the second video, obtaining an image emotion graph for the second video, based on the character emotion graph and the object emotion graph, selecting at least one first scene in the second video by comparing the user emotion graph of the user having watched the first video with the image emotion graph for the second video, and generating the summary video of the second video, based on the at least one first scene.

According to a second aspect of the disclosure, there is provided a device for generating a summary video, the device including a communication interface, a display, a memory storing one or more instructions, and a processor configured to generate the summary video by executing the one or more instructions, wherein the processor is further configured to, by executing the one or more instructions, obtain a user image in which a user watching a first video is photographed, during playback of the first video through the display, generate a user emotion graph of the user watching the first video, by analyzing an emotion of the user in the obtained user image, obtain a character emotion graph for the second video, by analyzing an emotion of a character in a second video that is a target of summarization, obtain an object emotion graph for an object in the second video, based on an object appearing in the second video, obtain an image emotion graph for the second video, based on the character emotion graph and the object emotion graph, select at least one first scene in the second video by comparing the user emotion graph of the user having watched the first video with the image emotion graph for the second video, and generate the summary video of the second video based on the at least one first scene.

According to a third aspect of the disclosure, a non-transitory computer-readable recording medium may have recorded thereon a program which, when executed by a computer, performs the method according to the first aspect of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
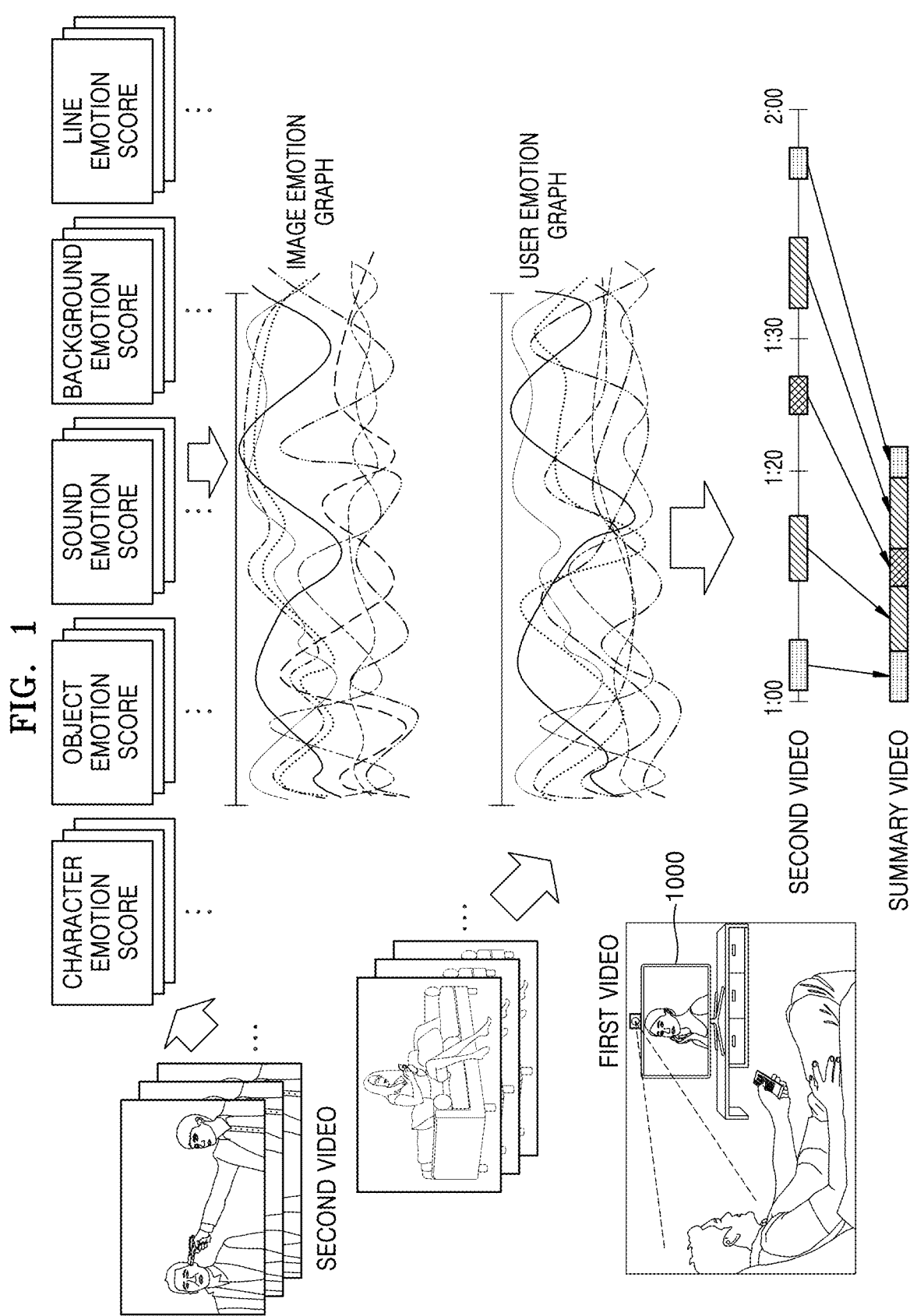
FIG. 1 illustrates an example in which a device generates a summary video, according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Throughout the disclosure, the expression "at least one of a, b or c" indicates only a, only b, only c, both a and b, both a and c, both b and c, all of a, b, and c, or variations thereof.

In the description of the embodiments of the disclosure, when a part is "connected" to another part, the part is not only "directly connected" to another part but also "electrically connected" to another part with another device intervening in them. When it is assumed that a certain part includes a certain component, the term "including" means that a corresponding component may further include other components unless a specific meaning opposed to the corresponding component is written.

Herein, a first video refers to a video used to generate a user emotion graph. The first video may be different from a second video that is a target of summarization. Before a summary video of the second video to be provided to a user is generated, an emotion of the user watching the first video may be analyzed in advance.

The second video may be a target of summarization. The second video may be different from the first video that is used to generate a user emotion graph.

The user emotion graph may show a change of emotions of the user watching a video over time, and may be generated based on, e.g., scores of the emotions of the user, calculated for a frame or a scene of a video including a photographed user.

A character emotion graph may show emotions of characters appearing in the video, and may be generated based on, e.g., scores of emotions, calculated for characters included in the frame or the scene of the second video.

Object emotion information may indicate emotions of characters at the time of appearance of a particular object in a video, and may be generated based on emotion scores of the characters at the time of appearance of the particular object in the video, by analyzing several videos.

An object emotion graph may show object emotion scores for objects appearing in the second video, and may be generated using the second video and previously obtained object emotion information.

Background emotion information may indicate emotions of characters at the time of appearance of a particular background in a video, and may be generated based on emotion scores of the characters at the time of appearance of the particular background in the video, by analyzing several videos.

A background emotion graph may show background emotion scores for backgrounds appearing in the second video, and may be generated using the second video and previously obtained background emotion information.

Sound emotion information may indicate emotions of characters at the time of output of a particular sound from a video, and may be generated based on emotion scores of the characters at the time of output of the particular sound from the video, by analyzing several videos.

A sound emotion graph may show sound emotion scores for sounds output in the second video, and may be generated using the second video and previously obtained sound emotion information.

Line emotion information may indicate emotions of characters at the time of output of a particular line or dialogue in a video, and may be generated based on emotion scores of the characters at the time of output of the particular line in the video, by analyzing several videos.

A line emotion graph may show line emotion scores for lines output in the second video, and may be generated using the second video and previously obtained line emotion information.

An image emotion graph may show a change of emotions of characters analyzed in the video, and may be generated based on, e.g., scores of emotions, calculated based on a character, an object, a background, a sound, and a line related to a frame or a scene in the second video.

Hereinafter, the disclosure will be described with reference to the accompanying drawings.

FIG. 1 illustrates an example in which a device generates a summary video, according to an embodiment of the disclosure.

Referring to FIG. 1, a device 1000 may generate and provide a summary video of a second video to a user who watched a first video. The device 1000 may photograph the user watching the first video and analyze a user's emotion from a captured image to generate a user emotion graph. The device 1000 may obtain an image emotion graph for the second video that is a target of summarization. For example, the device 1000 may obtain the image emotion graph generated based on character emotion scores, object emotion scores, sound emotion scores, background emotion scores, and line emotion scores, which are related to the second video. The device 1000 may select scenes to be included in a summary video of the second video by using the user emotion graph of the first video and the image emotion graph for the second video, and generate the summary video by connecting the selected scenes.

The device 1000 may be a smartphone, a tablet personal computer (PC), a PC, a smart television (TV), a cellular phone, a personal digital assistant (PDA), a laptop, a media player, a digital broadcasting terminal, or other mobile or non-mobile computing devices, without being limited thereto. The device 1000 may also be one of various electronic devices having a communication function and a video play function. The device 1000 may communicate with a server (not shown) over a network which may be implemented as a wired network such as a local area network (LAN), a wide area network (WAN), a value added network (VAN), etc., or any types of wireless networks such as a mobile radio communication network, a satellite communication network, etc.

Figure 2:
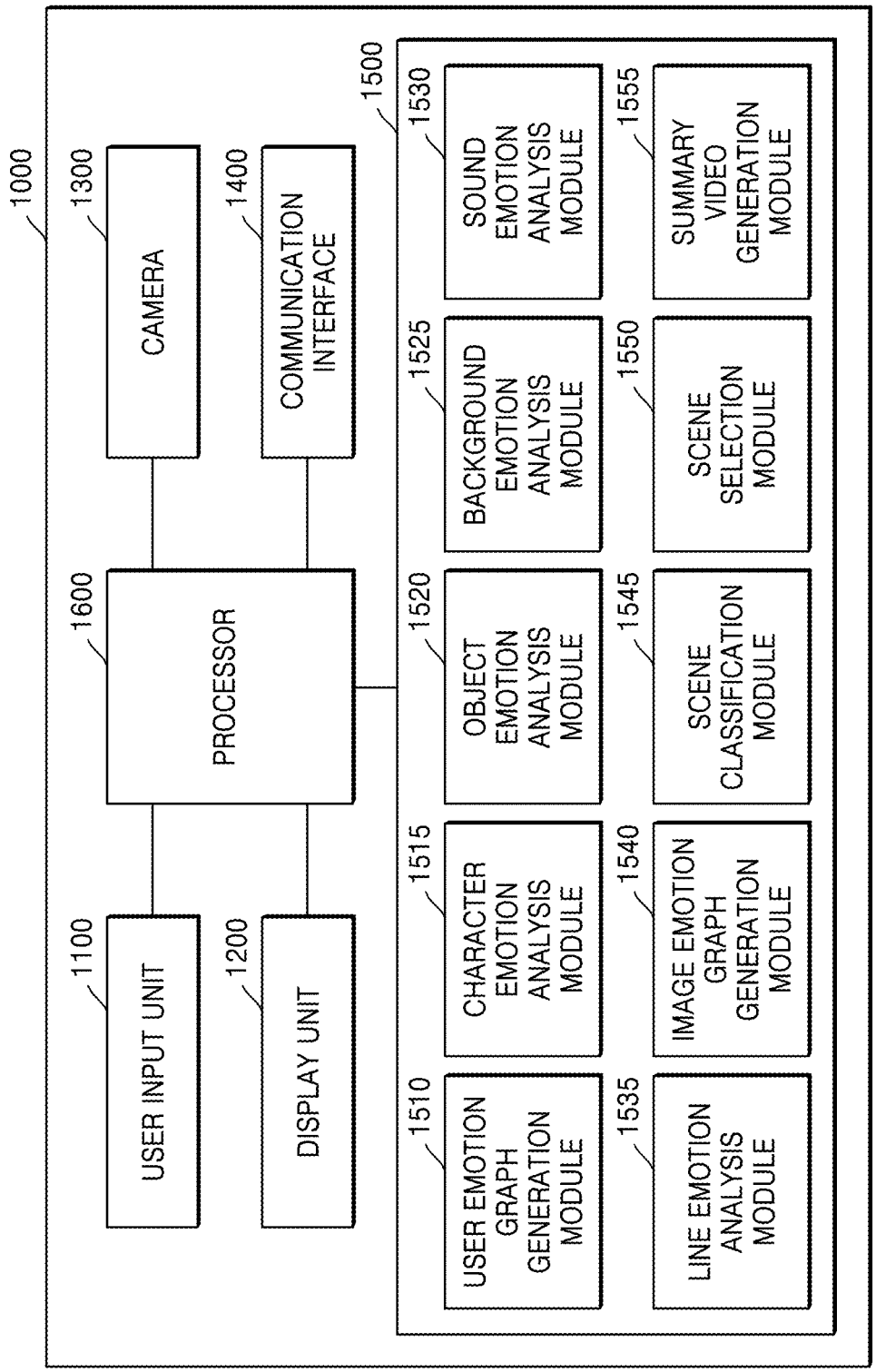
FIG. 2 illustrates a block diagram of a device according to an embodiment of the disclosure.

FIG. 2 illustrates a block diagram of a device according to an embodiment of the disclosure.

Referring to FIG. 2, the device 1000 according to an embodiment of the disclosure may include a user input unit 1100, a display unit 1200, a camera 1300, a communication interface 1400, a storage unit 1500 and a processor 1600.

The user input unit 1100 may be a means through which a user inputs data for controlling the device 1000. For example, the user input unit 1100 may include at least one of a keypad, a dome switch, a touch pad (a capacitive overlay type, a resistive overlay type, an infrared beam type, a surface acoustic wave type, an integral strain gauge type, a piezoelectric effect type, etc.), a jog wheel, or a jog switch, without being limited thereto. The user input unit 1100 may receive a user input for generating a summary video of the second video to be described later.

The display unit 1200 may display information processed in the device 1000. For example, the display unit 1200 may display a graphical user interface (GUI) for displaying a video played in the device 1000 or generating or displaying summary videos of the second video.

When the display unit 1200 and a touch pad are configured as a touch screen in a layer structure, the display unit 1200 may be used as an input device as well as an output device. The display unit 1200 may include at least one of a liquid crystal display (LCD), a thin film transistor (TFT) LCD, an organic light-emitting diode (OLED), a flexible display, a three-dimensional (3D) display, or an electrophoretic display. According to implementation types of the device 1000, the device 1000 may include two or more display units 1200.

The camera 1300 may photograph the periphery of the device 1000. The camera 1300 may obtain an image frame such as a still image, a moving image, etc., through an image sensor when a program for photographing is executed. For example, the camera 1300 may photograph the user watching the first video. The still image or moving image captured by the image sensor may be processed by the processor 1600 to be processed below or a separate image processor (not shown).

An image frame processed by the camera 1300 may be stored in the storage unit 1500 or may be transmitted to the outside through the communication interface 1400. Two or more cameras 1300 may be included according to a structural aspect of the device 1000.

The communication interface 1400 may include one or more elements that enable communication with an external device (not shown) and a server (not shown). For example, the communication interface 1400 may include a short-range communication unit, a mobile communication unit, and a broadcasting reception unit. A short-range wireless communication unit may include a Bluetooth Low Energy (BLE) communication unit, a near field communication (NFC) unit, a wireless local area network (WLAN) (WiFi) communication unit, a ZigBee communication unit, an infrared Data Association (IrDA) communication unit, a WiFi Direct (WFD) communication unit, an ultra wideband (UWB) communication unit, an Ant+ communication unit, etc., without being limited thereto. The mobile communication unit may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message. The broadcasting reception unit may receive a broadcasting signal and/or broadcasting-related information from an external source through a broadcasting channel. The broadcasting channel may include a satellite channel and a terrestrial channel.

The communication interface 1400 may transmit and receive information used for generating the summary video of the second video to and from an external device (not shown) and a server (not shown).

The storage unit 1500, according to an embodiment of the disclosure, may store programs to be executed by the processor 1600 to be described later, and store data input to or output from the device 1000.

The storage unit 1500 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, or the like.

Programs stored in the storage unit 1500 may be classified into a plurality of modules according to their functions, e.g., a user emotion graph generation module 1510, a character emotion analysis module 1515, an object emotion analysis module 1520, a background emotion analysis module 1525, a sound emotion analysis module 1530, a line emotion analysis module 1535, an image emotion graph generation module 1540, a scene classification module 1545, a scene selection module 1550, and a summary video generation module 1555.

The processor 1600 may control an overall operation of the device 1000. For example, the processor 1600 may control in overall the user input unit 1100, the display unit 1200, the camera 1300, the communication interface 1400, and the storage unit 1500, by executing programs stored in the storage unit 1500.

The processor 1600 may generate a user emotion graph indicating emotions of a user watching the first video by executing the user emotion graph generation module 1510 stored in the storage unit 1500. The first video may be different from the first video that is used to generate the user emotion graph. Before the processor 1600 generates the summary video of the second video to be provided to the user, the processor 1600 may generate the user emotion graph of the user watching the first video in advance. The user emotion graph may show a change of the emotions of the user watching the first video over time, and may be generated based on the scores of the emotions of the user, calculated for a frame or a scene of the video in which the user is photographed.

The processor 1600 may control the camera 1300 to photograph the user watching the first video while playing the first video through the display unit 1200, and generate the user emotion graph by analyzing the emotions of the user in a captured image. For example, the processor 1600 may generate the user emotion graph by analyzing a facial expression or voice of the user in the captured image.

The processor 1600 may obtain an emotion score of the user for a plurality of emotions by analyzing the facial expression of the user for a frame or scene of the video in which the user is photographed. For example, as an emotion score of a user for a first frame of the video in which the user is photographed, emotion scores such as 'anger: 20', 'fear: 85', 'happiness: 3', 'sadness: 40', 'surprise: 45', etc., are obtained, as an emotion score of the user for a second frame of the video in which the user is photographed, 'anger: 22', 'fear: 87', 'happiness: 5', 'sadness: 33', 'surprise: 43', etc., are obtained, as an emotion score of the user for a third frame of the video in which the user is photographed, emotion scores such as 'anger: 24', 'fear: 89', 'happiness: 7', 'sadness: 30', 'surprise: 40', etc., may be obtained. In addition, the processor 1600 may generate the user emotion graph for the user watching the first video, by using emotion scores corresponding to the first frame through an nth frame of the video in which the user is photographed. The first frame through the nth frame of the video in which the user is photographed may be consecutive frames, without being limited thereto. The first frame through the nth frame of the video in which the user is photographed may be frames selected at certain intervals among all frames of the video in which the user is photographed.

The processor 1600 may generate the user emotion graph by using an artificial intelligence model for analyzing an emotion of the user in the video. The processor 1600 may input the video in which the user watching the first video is photographed to an (artificial intelligence) AI model, and generate the user emotion graph by using emotion scores of the user output from the AI model.

The processor 1600 may analyze emotions of characters in the second video, by executing the character emotion analysis module 1515 stored in the storage unit 1500. The second video may be a video that is a target of summarization, and may be different from the first video that is used to generate the user emotion graph. The processor 1600 may obtain a character emotion score for a frame or a scene in the second video, by analyzing at least one of a facial expression, a voice, a line, or an action of characters in a frame or a scene of the second video that is a target of summarization, for the frame or the scene.

The processor 1600 may obtain an emotion score of a character for the frame or the scene of the second video, by using an AI model for analyzing an emotion of a character in a video. The processor 1600 may input the second video to the AI model that may output emotion scores of characters for a frame or a scene of the second video. The processor 1600 may generate the character emotion graph for the second video, by using emotion scores output from the AI model for the frame or the scene of the second video.

For example, when a character A and a character B are included in the first frame in the second video, the processor 1600 may obtain emotion scores of the character A and the character B included in the first frame in the second video, and calculate a character emotion score for the first frame of the second video based on the obtained emotion scores. In this case, the processor 1600 may calculate the character emotion score for the first frame of the second video, by applying different weight values to the emotion scores of the character A and the character B, based on an importance of the character A and an importance of the character B.

In the same manner, the processor 1600 may also calculate the character emotion score for the first frame through the nth frame of the second video and generate the character emotion graph for the second video based on the calculated character emotion score.

Meanwhile, calculation of the character emotion score and generation of the character emotion graph may be performed by the server (not shown) instead of the device 1000. In this case, the device 1000 may receive the character emotion score and/or the character emotion graph for the second video from the server (not shown).

The processor 1600 may analyze emotions related to objects in the second video, by executing the object emotion analysis module 1520 stored in the storage unit 1500. The processor 1600 may obtain object emotion information related to at least one object and extract an object emotion score of an object appearing in the second video from the object emotion information.

The processor 1600 may obtain the object emotion information generated by analyzing an emotion of a character at the time of appearance of the object in at least one third video. The object emotion information may indicate emotions of characters at the time of appearance of a particular object in a video, and may be generated based on emotion scores of the characters at the time of appearance of the particular object. The third video may be used to analyze emotions of characters related to an object appearing in the video, and may be different from the first video and the second video. For example, when an object A, a character AA, and a character BB appear in a first frame of the third video, an emotion score may be calculated from a facial expression of the character AA and a facial expression of the character BB, and when the object A, the character AA, and a character CC appear in a tenth frame of the third video, an emotion score may be calculated from a facial expression of the character AA and a facial expression of the character CC. While it has been described above that the emotion character is calculated based on the facial expression of the character, the disclosure is not limited thereto. For example, an emotion score of a character in the third video may be calculated based on at least one of a facial expression, a voice, an action, or a line of the character. The emotion score of the object A may also be calculated based on emotions of characters at the time of appearance of the object A from each of a plurality of third videos. The object emotion score for the object A may also be calculated based on calculated emotion scores.

The object emotion score for a plurality of objects in the third video may be calculated. For example, when the object A and an object B appear together in a particular frame of the third video, an object emotion score for the object A and the object B may be calculated.

The object emotion score may be calculated by the device 1000, without being limited thereto. The device 1000 may receive object emotion information regarding at least one object from an external device such as a server (not shown).

The processor 1600 may identify an object in a frame or a scene of the second video for the frame or the scene, and extract an object emotion score of an object of the same type as the identified object from the object emotion information. For example, when the object A is included in the frame of the second video, the processor 1600 may extract an object emotion score corresponding to the object A from the object emotion information. For example, when the object A and the object B are included in the frame of the second video, the processor 1600 may extract object emotion scores corresponding to the object A and the object B from the object emotion information.

In the same manner, the processor 1600 may also calculate the object emotion scores for the first frame through the nth frame of the second video and generate the object emotion graph for the second video based on the calculated object emotion scores. The object emotion graph may show object emotion scores for objects appearing in the second video, and may be generated using the second video and previously obtained object emotion information.

Meanwhile, calculation of the object emotion score and generation of the object emotion graph may be performed by the server (not shown) instead of the device 1000. In this case, the device 1000 may receive the object emotion score and/or the object emotion graph for the second video from the server (not shown).

The processor 1600 may analyze emotions related to a background in the second video, by executing the background emotion analysis module 1525 stored in the storage unit 1500. The processor 1600 may obtain background emotion information related to at least one background and extract a background emotion score of a background appearing in the second video from the background emotion information. The background emotion information may indicate emotions of characters at the time of appearance of a particular background in a video, and may be generated based on emotion scores of the characters at the time of appearance of the particular background in the video, by analyzing several videos.

The processor 1600 may obtain the background emotion information generated based on an emotion of a character at the time of appearance of the particular background in at least one fourth video. The fourth video may be used to analyze emotions of characters related to a background appearing in the video, and may be different from the first video and the second video. The fourth video may be the same as or different from the third video. For example, when a background A, the character AA, and the character BB appear in a first frame of the fourth video, an emotion score may be calculated from a facial expression of the character AA and a facial expression of the character BB, and when the background A, the character AA, and the character CC appear in a tenth frame of the fourth video, an emotion score may be calculated from the facial expression of the character AA and the facial expression of the character CC. While it has been described above that the emotion character is calculated based on the facial expression of the character, the disclosure is not limited thereto. For example, an emotion score of a character in the fourth video may be calculated based on at least one of a facial expression, a voice, an action, or a line of the character. The emotion score of the background A may also be calculated based on emotions of characters at the time of appearance of the background A from each of a plurality of fourth videos. The background emotion score for the background A may also be calculated based on calculated emotion scores.

The background emotion score may be calculated by the device 1000, without being limited thereto. The device 1000 may receive background emotion information regarding at least one background from an external device such as a server (not shown).

The processor 1600 may identify a background in a frame or a scene of the second video for the frame or the scene, and extract a background emotion score of a background of the same type as the identified object from the background emotion information.

In the same manner, the processor 1600 may also calculate the background emotion scores for the first frame through the nth frame of the second video and generate the background emotion graph for the second video based on the calculated background emotion scores. The background emotion graph may show background emotion scores for backgrounds appearing in the second video, and may be generated using the second video and previously obtained background emotion information.

Meanwhile, calculation of the background emotion score and generation of the background emotion graph may be performed by the server (not shown) instead of the device 1000. In this case, the device 1000 may receive the background emotion score and/or the background emotion graph for the second video from the server (not shown).

The processor 1600 may analyze emotions related to sounds output from the second video, by executing the sound emotion analysis module 1530 stored in the storage unit 1500. The processor 1600 may obtain sound emotion information related to at least one sound and extract a sound emotion score related to a sound output from the second video from the sound emotion information.

The processor 1600 may obtain the sound emotion information generated based on an emotion of a character at the time of output of a sound from at least one fifth video. The sound emotion information may indicate emotions of characters at the time of output of a particular sound from a video, and may be generated based on emotion scores of the characters at the time of output of the particular sound from the video, by analyzing several videos. The fifth video may be used to analyze emotions of characters related to a sound output from the video, and may be different from the first video and the second video. The fifth video may be the same as or different from the third video and the fourth video. For example, when a sound A is output and a character DD and a character EE appear in a first frame through a tenth frame of the fifth video, an emotion score may be calculated from a facial expression of the character DD and a facial expression of the character EE, and when a sound B is output and a character FF and a character GG appear in a 20th frame through a 30th frame of the fifth video, an emotion score may be calculated from a facial expression of the character DD and a facial expression of the character EE. While it has been described above that the emotion character is calculated based on the facial expression of the character, the disclosure is not limited thereto. For example, an emotion score of a character in the fifth video may be calculated based on at least one of a facial expression, a voice, an action, or a line of the character. The emotion score of the sound A may also be calculated based on emotions of characters at the time of appearance of the sound A from each of a plurality of fifth videos. The sound emotion score for the sound A may also be calculated based on calculated emotion scores.

The sound emotion score for a plurality of sounds in the fifth video may be calculated. For example, when the sound A and a sound B are output together in a particular frame of the fifth video, an object emotion score for the sound A and the sound B may be calculated.

The sound emotion score may be calculated by the device 1000, without being limited thereto. The device 1000 may receive sound emotion information regarding at least one sound from an external device such as a server (not shown).

The processor 1600 may identify a sound corresponding to a frame or a scene of the second video, and extract a sound emotion score regarding a sound recognized as being the same as the identified sound from the sound emotion information. For example, when the sound A is output from a particular frame or a particular scene of the second video, the processor 1600 may extract a sound emotion score corresponding to the sound A from the sound emotion information. For example, when the sound A and the sound B are output from a particular frame or a particular scene of the second video, the processor 1600 may extract sound emotion scores corresponding to the sound A and the sound B from the sound emotion information.

In the same manner, the processor 1600 may also calculate the sound emotion scores for the first frame through the nth frame of the second video and generate the sound emotion graph for the second video based on the calculated sound emotion scores. The sound emotion graph may show sound emotion scores for sounds output from the second video, and may be generated using the second video and previously obtained sound emotion information.

Meanwhile, calculation of the sound emotion score and generation of the sound emotion graph may be performed by the server (not shown) instead of the device 1000. In this case, the device 1000 may receive the sound emotion score and/or the sound emotion graph for the second video from the server (not shown).

The processor 1600 may calculate a line emotion score for the second video based on words included in a line of characters in the second video, by executing the line emotion analysis module 1535 stored in the storage unit 1500. In this case, the device 1000 may previously store line emotion information related to at least one line, extract line emotion scores related to lines included in the second video from the line emotion information, and generate a line emotion graph for the second video based on the extracted line emotion scores.

The line emotion information may indicate emotions of characters at the time of output of a particular line or dialogue in a video, and may be generated based on emotion scores of the characters at the time of output of the particular line in the video, by analyzing several videos. The line emotion graph may also show line emotion scores for lines output from the second video, and may be generated using the second video and previously obtained line emotion information.

Meanwhile, calculation of the line emotion score and generation of the line emotion graph may be performed by the server (not shown) instead of the device 1000. In this case, the device 1000 may receive the line emotion score and/or the line emotion graph for the second video from the server (not shown).

The processor 1600 may generate an image emotion graph for the second video, by executing the image emotion graph generation module 1540 stored in the storage unit 1500.

The processor 1600 may generate the image emotion graph for the second video, by using a character emotion score, an object emotion score, a background emotion score, a sound emotion score, and a line emotion score which are calculated for the frame or the scene of the second video. The processor 1600 may generate the image emotion graph for the second video, by using a character emotion graph, an object emotion graph, a background emotion graph, a sound emotion graph, and a line emotion graph which are calculated for the frame or the scene of the second video.

The processor 1600 may generate the image emotion graph for the second video, by applying different weight values to the character emotion score, the object emotion score, the background emotion score, the sound emotion score, and the line emotion score which are calculated for the frame or the scene of the second video. For example, the processor 1600 may calculate an emotion score for a frame or a scene, by multiplying the character emotion score, the object emotion score, the background emotion score, the sound emotion score, and the line emotion score by the different weight values and summing the weight value-multiplied scores for the frame or the scene. The processor 1600 may generate the image emotion graph for the second video, by using the emotion score calculated for the frame or the scene.

The processor 1600 may select some of the object emotion score, the background emotion score, the sound emotion score, and the line emotion score obtained for the frame or the scene of the second video, and generate the image emotion graph for the second video by using the selected some and the character emotion score obtained for the frame or the scene of the second video.

Meanwhile, generation of the image emotion graph may be performed by a server (not shown) instead of the device 1000. In this case, the device 1000 may receive the image emotion graph for the second video from the server (not shown).

The processor 1600 may classify scenes in the second video, by executing the scene classification module 1545 stored in the storage unit 1500. The processor 1600 may identify a character in a frame for each frame of the second video and group frames of the second video based on the identified character to classify the scenes in the second video.

The processor 1600 may identify an object and a background in a frame for each frame of the second video and group the frames of the second video based on the identified object and background to classify the scenes in the second video.

The processor 1600 may classify the scenes in the second video by grouping frames having the same background music based on background music corresponding to a frame of the second video.

The processor 1600 may determine an importance of each character appearing in the second video. The processor 1600 may identify characters in a frame for each frame of the second video, count the number of times each of the characters is included in the frames of the second video, and determine the importance of each character based on the counted number. For example, the processor 1600 may determine the character A as a main actor based on the number of times each character appears in the second video.

The processor 1600 may select scenes to be included in the summary video from among the scenes of the second video, by executing the scene selection module 1550 stored in the storage unit 1500.

The processor 1600 may select a scene including a particular emotion from among the scenes of the second video, when a score of the particular emotion exceeds a certain threshold value in the image emotion graph. For example, the processor 1600 may select a scene corresponding to a frame including happiness having a score of 9 or higher among anger, contempt, fear, disgust, happiness, neutral, sadness, and surprise. Alternatively, for example, the processor 1600 may select a scene corresponding to a frame including an emotion having a score of 9 or higher among anger, contempt, fear, disgust, happiness, neutral, sadness, and surprise. Alternatively, for example, the processor 1600 may select a scene corresponding to a frame including three or more emotions having scores of 8 or higher among anger, contempt, fear, disgust, happiness, neutral, sadness, and surprise. When the processor 1600 selects a scene based on a score of a particular emotion, a magnitude of a threshold value and the number of emotions having a score greater than the threshold value may be set variously.

The processor 1600 may compare the user emotion graph with the image emotion graph and select a scene to be included in the summary video from among the scenes of the second video. For example, the processor 1600 may calculate a similarity between a slope change of emotion curves in the user emotion graph and a slope change of emotion curves in the image emotion graph and select a scene corresponding to a part of the image emotion graph having a similarity greater than or equal to a certain threshold value as the scene to be included in the summary video.

The processor 1600 may also select the scene to be included in the summary video, based on a peak value of emotions in a part corresponding to a particular scene in the image emotion graph and a peak value of emotions in a particular part in the user emotion graph. For example, when 'anger', 'fear', and 'sadness' have peak values in a first part corresponding to a first scene in the image emotion graph and 'anger', 'fear', and 'sadness' have peak values in a second part, which is similar to the first part of the image emotion graph, in the user emotion graph, the processor 1600 may select a first scene corresponding to the first part in the second video as the scene to be included in the summary video because three emotions have peak values in the first part and the second part. To select the scene to be included in the summary video, in a part of the image emotion graph and a part, which is similar to the part of the image emotion graph, of the user emotion graph, whether emotions having peak values are the same between the parts, the number of peak values, amplitudes of the peak values, etc., may be set variously.

The processor 1600 may determine a scene in which characters that are important appear many times as a main scene among the scenes of the second video. For example, the processor 1600 may determine as a main scene, a scene in which characters having an importance value that is greater than or equal to a certain threshold value appear a number of times greater than or equal to a certain threshold value. The processor 1600 may select a scene, determined as the main scene, as the scene to be included in the summary video. Alternatively, by using a part corresponding to the scene, determined as the main scene, in the image emotion graph, the processor 1600 may select the scene corresponding to the part as the scene to be included in the summary video.

The processor 1600 may generate the summary video including selected scenes, by executing the summary video generation module 1555 stored in the storage unit 1500. The processor 1600 may obtain the frames corresponding to the selected scenes from the second video and connect the obtained frames to generate the summary video.

Figure 3:
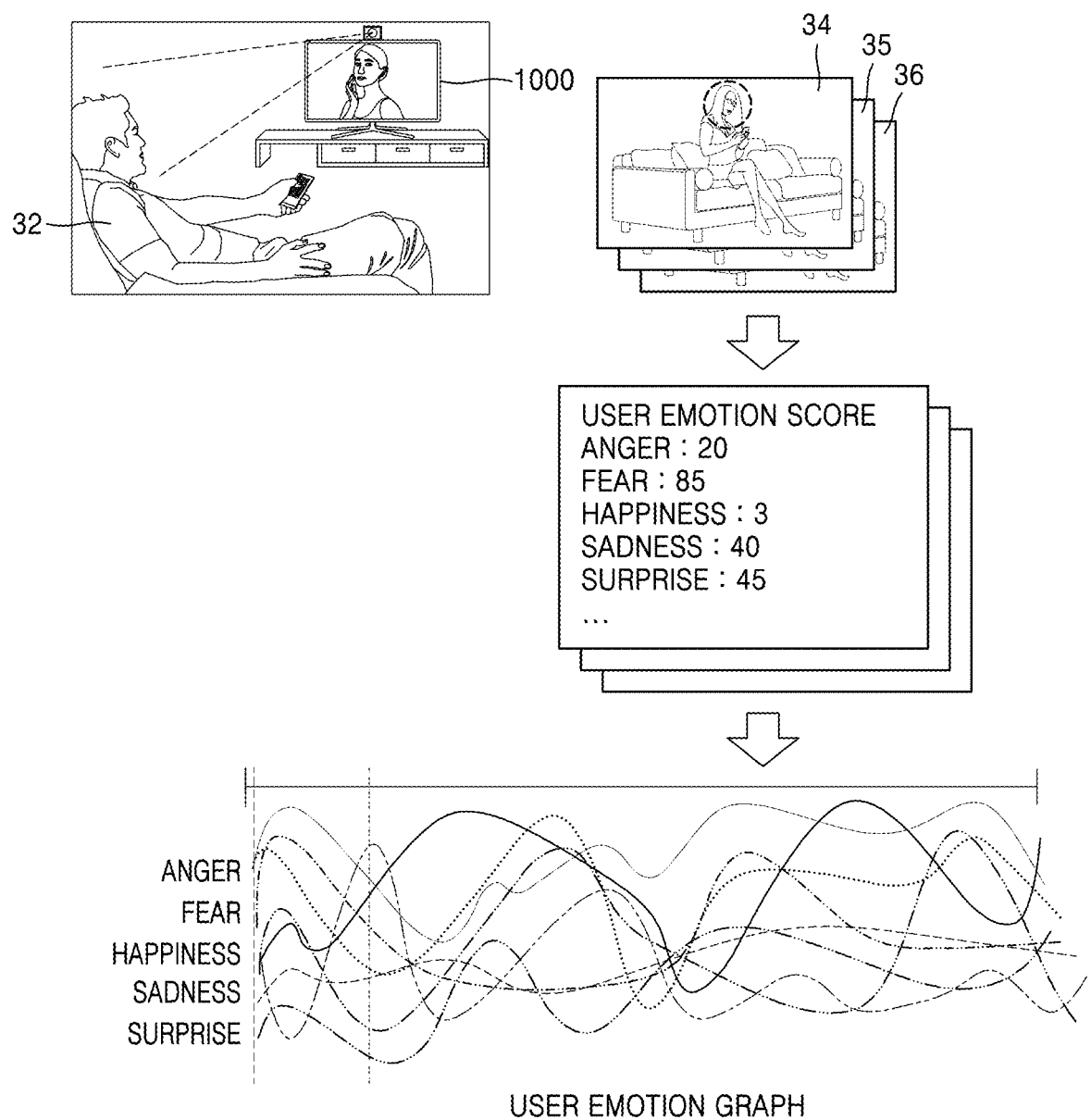
FIG. 3 illustrates an example in which a user emotion graph is generated, according to an embodiment of the disclosure.

FIG. 3 illustrates an example in which a user emotion graph is generated, according to an embodiment of the disclosure.

Referring to FIG. 3, the device 1000 may analyze an emotion of a user 32 watching the first video and generate the user emotion graph indicating an emotion change of the user 32. For example, the device 1000 may photograph the user 32 while playing the first video, and analyze facial expressions of the user 32 in a captured image to identify a change of emotions of the user 32.

For example, the device 1000 may obtain as emotion scores of the user 32 for a frame 34 of a video in which the user 32 is photographed, emotion scores such as 'anger: 20', 'fear: 85', 'happiness: 3', 'sadness: 40', 'surprise: 45', etc., obtain emotion scores of the user 32 for a frame 35 of the video in which the user 32 is photographed, and emotion scores of the user 32 for a frame 36 of the video in which the user 32 is photographed. In addition, the device 1000 may generate the user emotion graph for the user 32 watching the first video, by using emotion scores obtained for each frame of the video in which the user 32 is photographed. In this case, the processor 1600 may generate the user emotion graph by using an AI model for analyzing an emotion of the user 32 in the video. The processor 1600 may input the video in which the user 32 watching the first video is photographed to the AI model, and generate the user emotion graph indicating an emotion change of the user 32 during playback of the first video by using emotion scores of the user 32 output from the AI model.

Figure 4:
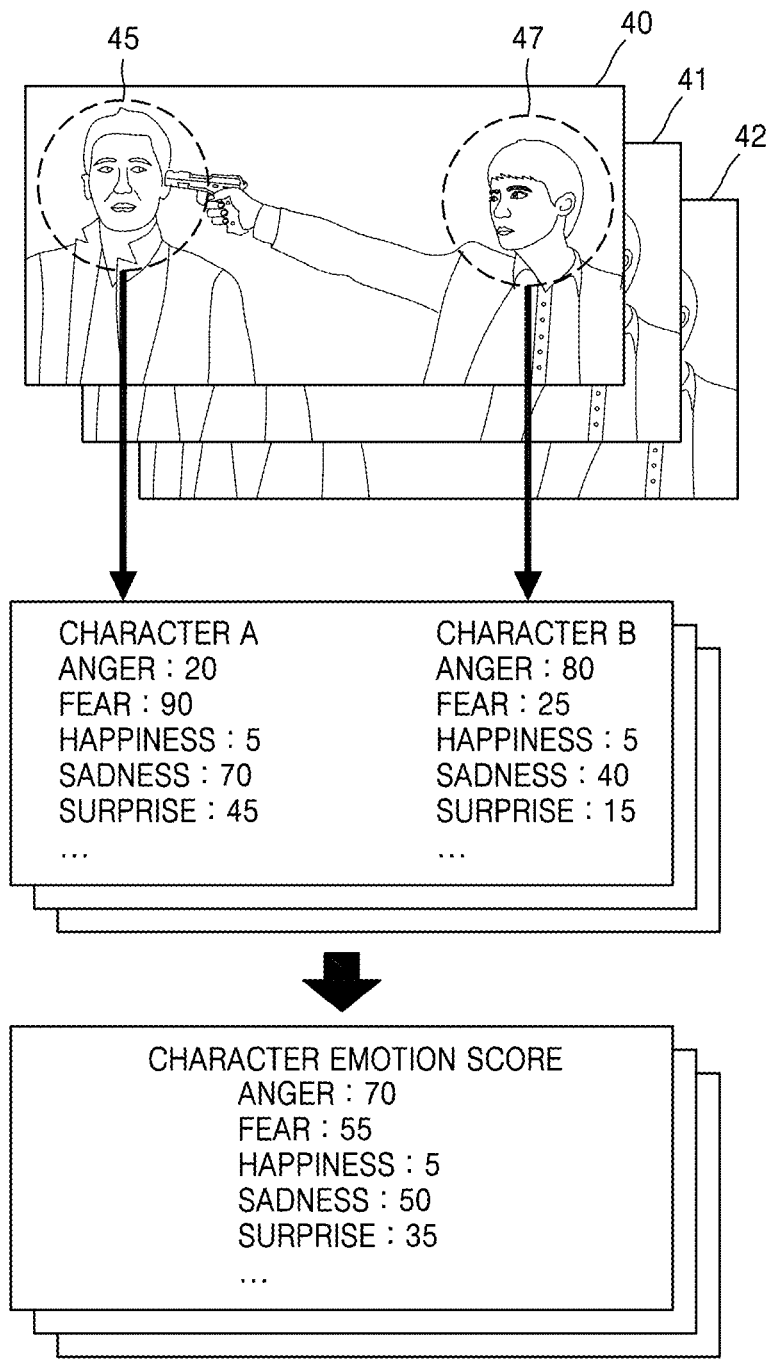
FIG. 4 illustrates an example in which a character emotion score is obtained, according to an embodiment of the disclosure.

FIG. 4 illustrates an example in which a character emotion score is obtained, according to an embodiment of the disclosure.

Referring to FIG. 4, by analyzing emotions of characters included in a frame for each frame of the second video, a character emotion score for a frame may be obtained. For example, the character A and the character B may be included in a frame 40 of the second video. In this case, by analyzing a facial expression 45 of the character A in the frame 40 of the second video, scores of emotions of the character A may be obtained. For example, as emotion scores of the character A, scores such as 'anger: 20', 'fear: 90', 'happiness: 5', 'sadness: 70', 'surprise: 45', etc., may be obtained. In addition, by analyzing a facial expression 47 of the character B in the frame 40 of the second video, scores of emotions of the character B may be obtained. For example, as emotion scores of the character B, scores such as 'anger: 80', 'fear: 25', 'happiness: 5', 'sadness: 40', 'surprise: 15', etc., may be obtained.

Thereafter, different weight values may be applied to emotion scores of the character A and emotion scores of the character B, and as character emotion scores for the frame 40 of the second video, scores such as 'anger: 70', 'fear: 55', 'happiness: 6', 'sadness: 50', 'surprise: 35', etc., may be obtained based on combinations of emotion scores to which the weight values are applied.

For the other frames including a frame 41 and a frame 42 of the second video, character emotion scores may be calculated.

In this case, character emotion scores may be obtained using an AI model for analyzing an emotion of a character in the video. By inputting the AI model to the second video, character emotion scores related to characters appearing in a frame may be obtained for each frame of the second video. The device 1000 may generate the character emotion graph for the second video based on the character emotion scores.

Figure 5:
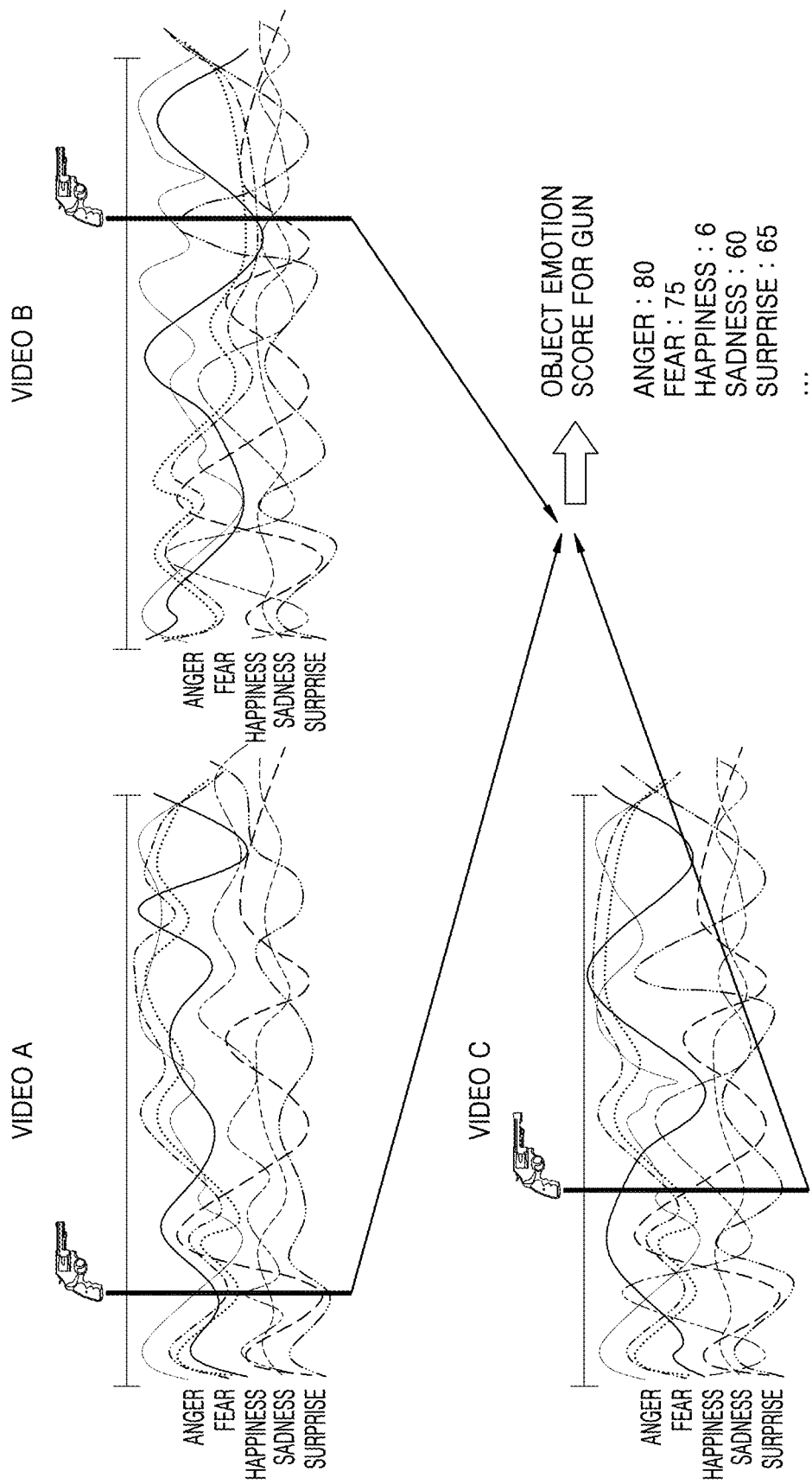
FIG. 5 illustrates an example in which character emotion scores are obtained, according to an embodiment of the disclosure.

FIG. 5 illustrates an example in which character emotion scores are obtained, according to an embodiment of the disclosure.

Referring to FIG. 5, object emotion scores for a particular object may be obtained based on emotions of characters at the time of appearance of the particular object in videos. For example, when a 'gun' appears in a particular frame of a video A, emotion scores of characters in the frame may be obtained, and when a 'gun' appears in a particular frame of a video B, emotion scores of characters in the frame may be obtained, and when a 'gun' appears in a particular frame of a video C, emotion scores of characters in the frame may be calculated. In this case, the video A, the video B, and the video C may be different from the first video and the second video.

The object emotion scores for the 'gun' may be calculated by combining the calculated emotion scores. In this case, for example, based on an average value of the calculated emotion scores, object emotion scores may be calculated. In addition, for example, certain weight values may be applied to the calculated emotion scores, and the object emotion scores may be calculated based on the weighted emotion scores.

While an object emotion score at the time of appearance of one object is obtained in FIG. 5, the disclosure is not limited thereto. For example, when a plurality of objects appear in a frame of a video, object emotion scores for the plurality of objects may be obtained. In addition, for example, when a first object appears together with a second object in a frame of a video, a weight value for the first object may be determined according to a second object. Moreover, by analyzing three or more multiple videos, object emotion scores for a particular object may be generated in advance.

Figure 6:
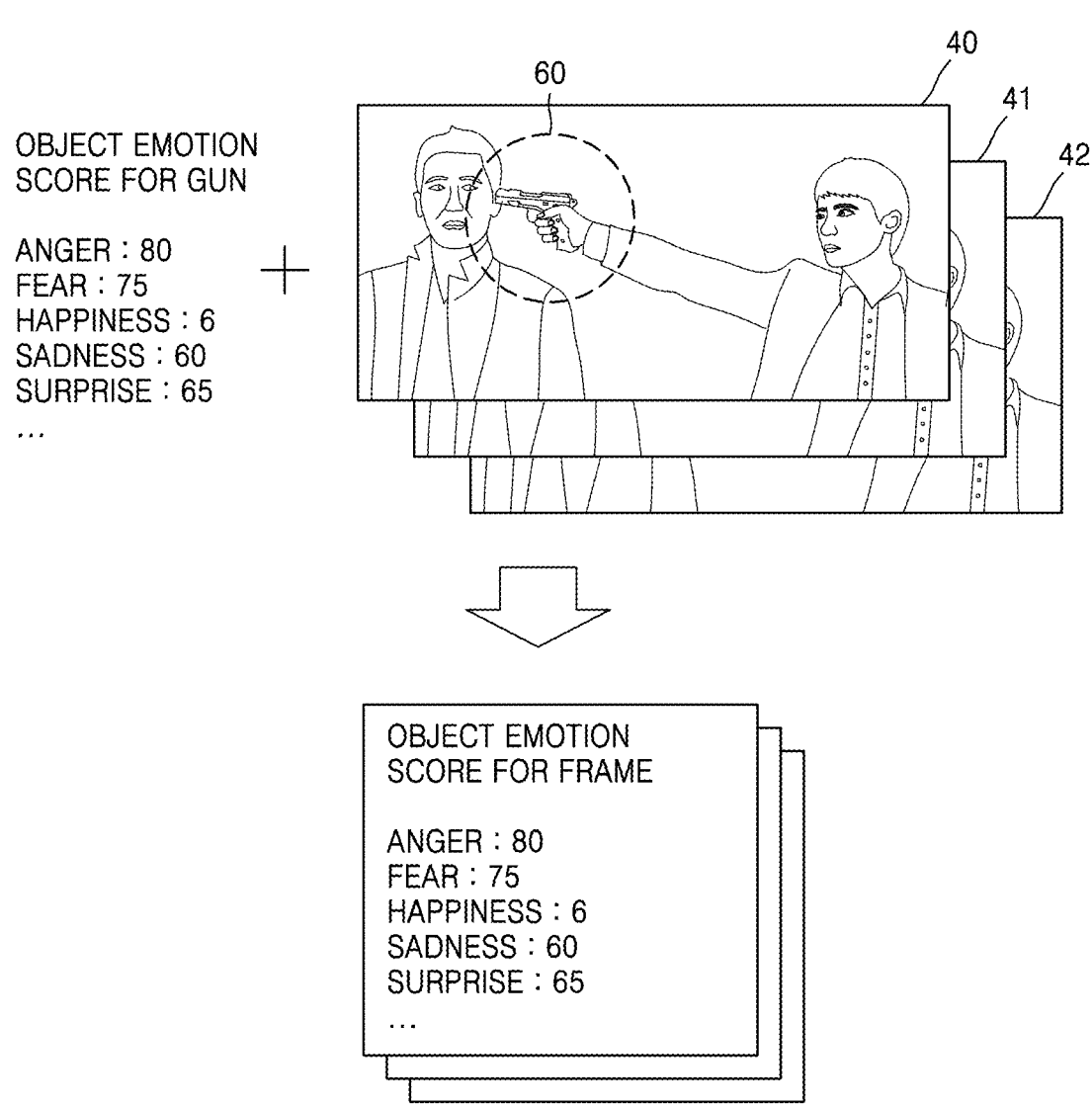
FIG. 6 illustrates an example in which a device obtains an object emotion score for a second video, according to an embodiment of the disclosure.

FIG. 6 illustrates an example in which a device obtains an object emotion score for a second video, according to an embodiment of the disclosure.

The device 1000 may obtain object emotion scores for objects included in a frame for each frame of the second video.

The device 1000 may previously receive and store object emotion information from the server (not shown) to obtain the object emotion scores for the objects in the second video. The object emotion information may indicate emotions of characters at the time of appearance of a particular object in a video, and may be generated based on emotion scores of the characters at the time of appearance of the particular object in the video, by analyzing several videos in the server (not shown).

The device 1000 may identify appearance of the 'gun' in the frame 40 of the second video and extract he object emotion scores regarding the 'gun' from the object emotion information. The device 1000 may determine the extracted object emotion scores as the object emotion scores for the frame 40.

The device 1000 may obtain the object emotion scores for the other frames including the frame 41 and the frame 42 of the second video and generate a graph indicating the object emotion scores for the objects appearing in the second video.

Figure 7:
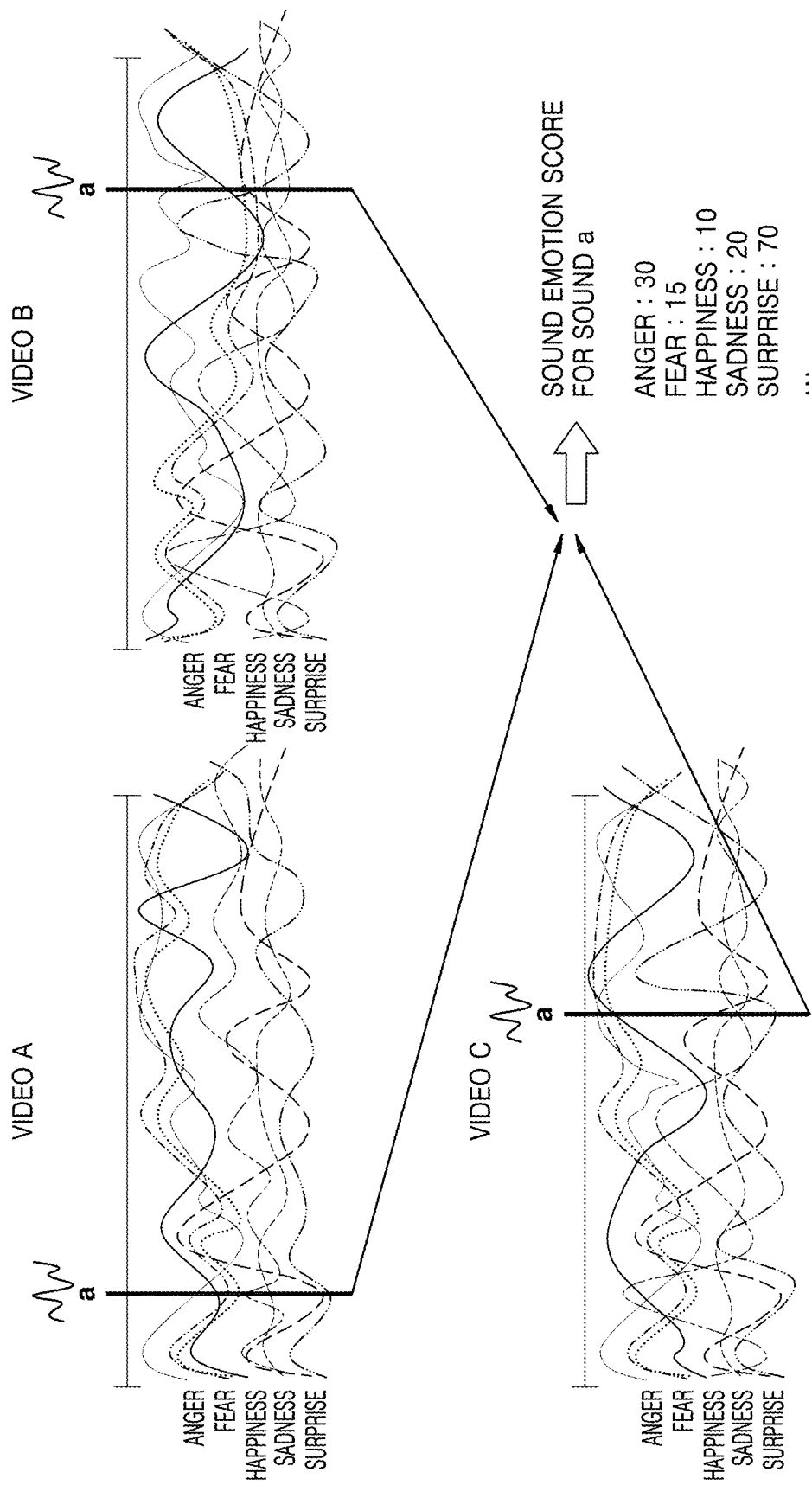
FIG. 7 illustrates an example in which sound emotion scores are obtained, according to an embodiment of the disclosure.

FIG. 7 illustrates an example in which sound emotion scores are obtained, according to an embodiment of the disclosure.

Referring to FIG. 7, sound emotion scores for a particular sound may be obtained based on emotions of characters at the time of output of the particular sound from videos. For example, when a sound a is output from a particular frame section of the video A, emotion scores of characters in the frame section may be obtained, and when the sound a is output from a particular frame section of the video B, emotion scores of characters in the frame section may be obtained, and when the sound a is output from a particular frame section of the video C, emotion scores of characters in the frame section may be calculated. In this case, the video A, the video B, and the video C may be different from the first video and the second video. While it is illustrated in FIG. 7 that the video A, the video B, and the video C used in the sound emotion scores are the same as the videos of FIG. 5, the disclosure is not limited thereto. The videos used to obtain the sound emotion scores in FIG. 7 may be different from the videos of FIG. 5.

The sound emotion scores for the sound a may also be calculated by combining calculated emotion scores. In this case, for example, based on an average value of the calculated emotion scores, sound emotion scores may be calculated. In addition, for example, certain weight values may be applied to the calculated emotion scores, and the sound emotion scores may be calculated based on the weighted emotion scores.

While a sound emotion score at the time of output of one sound is obtained in FIG. 7, the disclosure is not limited thereto. For example, when a plurality of sounds are output from a frame section of a video, sound emotion scores for the plurality of sounds may be obtained. For example, when the sound a and a sound b are output together in a frame section of a video, a weight value for the sound a may be determined according to the sound b. A weight value for a sound output from a frame may be determined differently according to an object appearing at the time of output of the sound. Moreover, by analyzing three or more multiple videos, sound emotion scores for a particular sound may be generated in advance.

Figure 8:
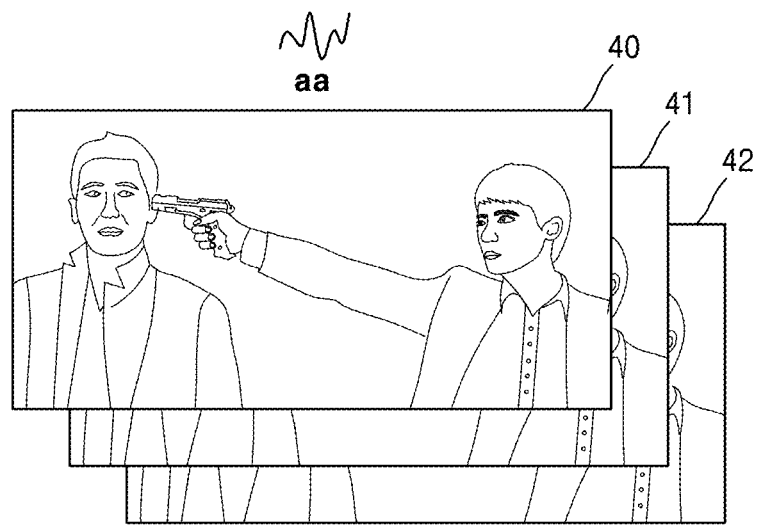
FIG. 8 illustrates an example in which a device obtains a sound emotion score for a second video, according to an embodiment of the disclosure.
Figure 8:
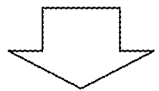
Figure 8:
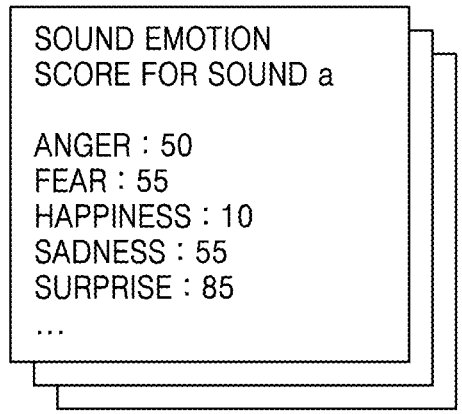

FIG. 8 illustrates an example in which a device obtains a sound emotion score for a second video, according to an embodiment of the disclosure.

The device 1000 may obtain sound emotion scores for a sound in a frame for each frame of the second video.

The device 1000 may previously receive and store sound emotion information from the server (not shown) to obtain sound emotion scores for sounds output from the second video. The sound emotion information may indicate emotions of characters at the time of output of a particular sound from a video, and may be generated based on emotion scores of the characters at the time of output of the particular sound from the video, by analyzing several videos in the server (not shown).

The device 1000 may identify output of a sound aa in the frame 40, the frame 41, and the frame 42 of the second video and extract sound emotion scores for the sound aa from the sound emotion information. The device 1000 may extract the sound emotion scores for the sound a determined as being the same as the identified sound aa from the sound emotion information. The sounds determined as being the same as each other may have similarities greater than or equal to a certain threshold value.

The device 1000 may determine the extracted sound emotion scores as the sound emotion scores for the frame 40, the frame 41, and the frame 42. The device 1000 may generate a graph indicating sound emotion scores for sounds output from the second video.

Figure 9:
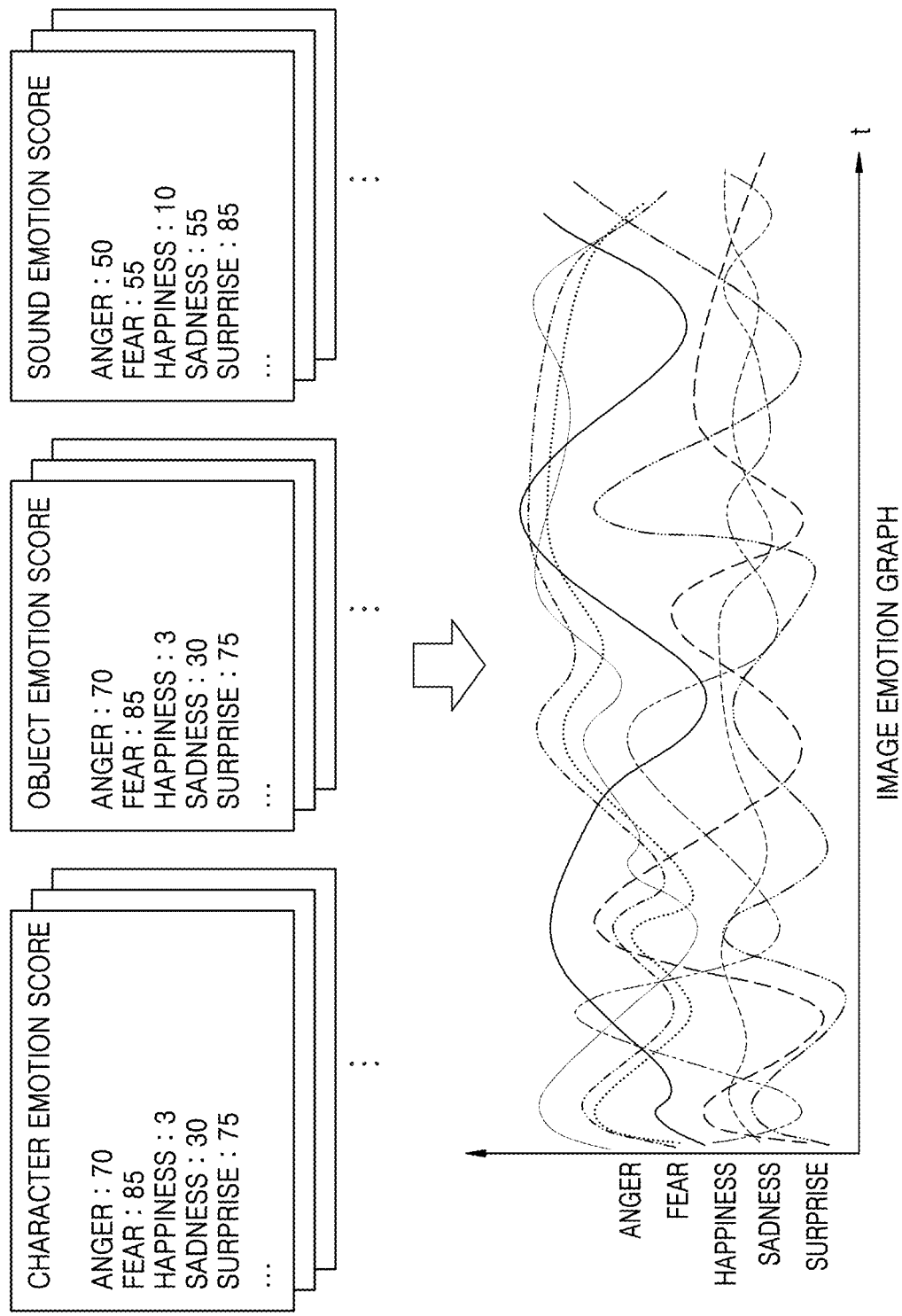
FIG. 9 illustrates an example in which an image emotion graph for a second video is generated based on a character emotion score, an object emotion score, and a sound emotion score, according to an embodiment of the disclosure.

FIG. 9 illustrates an example in which an image emotion graph for a second video is generated based on a character emotion score, an object emotion score, and a sound emotion score, according to an embodiment of the disclosure.

Referring to FIG. 9, the device 1000 may generate an image emotion graph by using character emotion scores, object emotion scores, and sound emotion scores, which are obtained for each frame of the second video. The device 1000 may obtain a character emotion graph, an object emotion graph, and a sound emotion graph for the second video, and generate an image emotion graph by combining character emotion scores, object emotion scores, and sound emotion scores for each frame of the second video in the graphs. In this case, for example, the device 1000 may determine a weight value for character emotion scores, a weight value for object emotion scores, and a weight value for sound emotion scores, and generate an image emotion graph by obtaining an average value of the character emotion scores, the object emotion scores, and the sound emotion scores to which the determined weight values are applied. Alternatively, for example, the device 1000 may multiply the character emotion scores, the object emotion scores, and the sound emotion scores by different weight values for each frame, sum the weighted scores to calculate emotion scores for each frame, and generate the image emotion graph.

Figure 10:
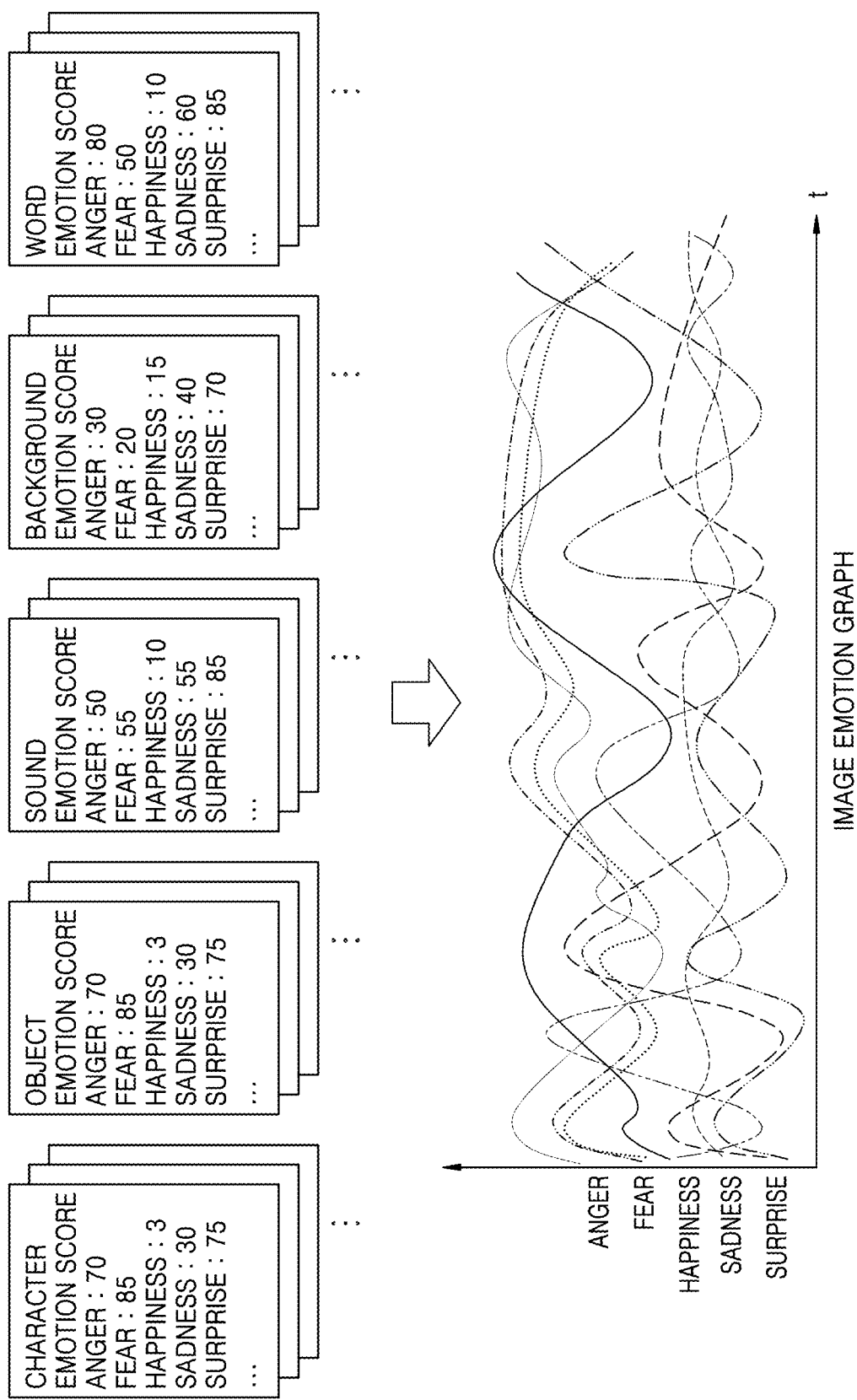
FIG. 10 illustrates an example in which an image emotion graph for a second video is generated based on a character emotion score, an object emotion score, a sound emotion score, a background emotion score, and a word emotion score, according to an embodiment of the disclosure.

FIG. 10 illustrates an example in which an image emotion graph for a second video is generated based on a character emotion score, an object emotion score, a sound emotion score, a background emotion score, and a word emotion score, according to an embodiment of the disclosure.

Referring to FIG. 10, the device 1000 may generate the image emotion graph by using the object emotion scores, the sound emotion scores, the background emotion scores, and the word emotion scores, which are obtained for each frame of the second video. The device 1000 may obtain the character emotion graph, the object emotion graph, the sound emotion graph, and the word emotion graph for the second video, and generate an image emotion graph by combining character emotion scores, object emotion scores, sound emotion scores, and word emotion scores for each frame of the second video in the graphs. In this case, for example, the device 1000 may determine a weight value for the character emotion scores, a weight value for the object emotion scores, a weight value for the sound emotion scores, a weight value for the background emotion scores, and a weight value for the word emotion scores, and generate the image emotion graph by obtaining an average value of the character emotion scores, the object emotion scores, the sound emotion scores, and the word emotion scores to which the determined weight values are applied. Alternatively, for example, the device 1000 may multiply the character emotion scores, the object emotion scores, the sound emotion scores, the background emotion scores, and the word emotion scores by different weight values for each frame, sum the weighted scores to calculate emotion scores for each frame, and generate the image emotion graph.

Figure 11:
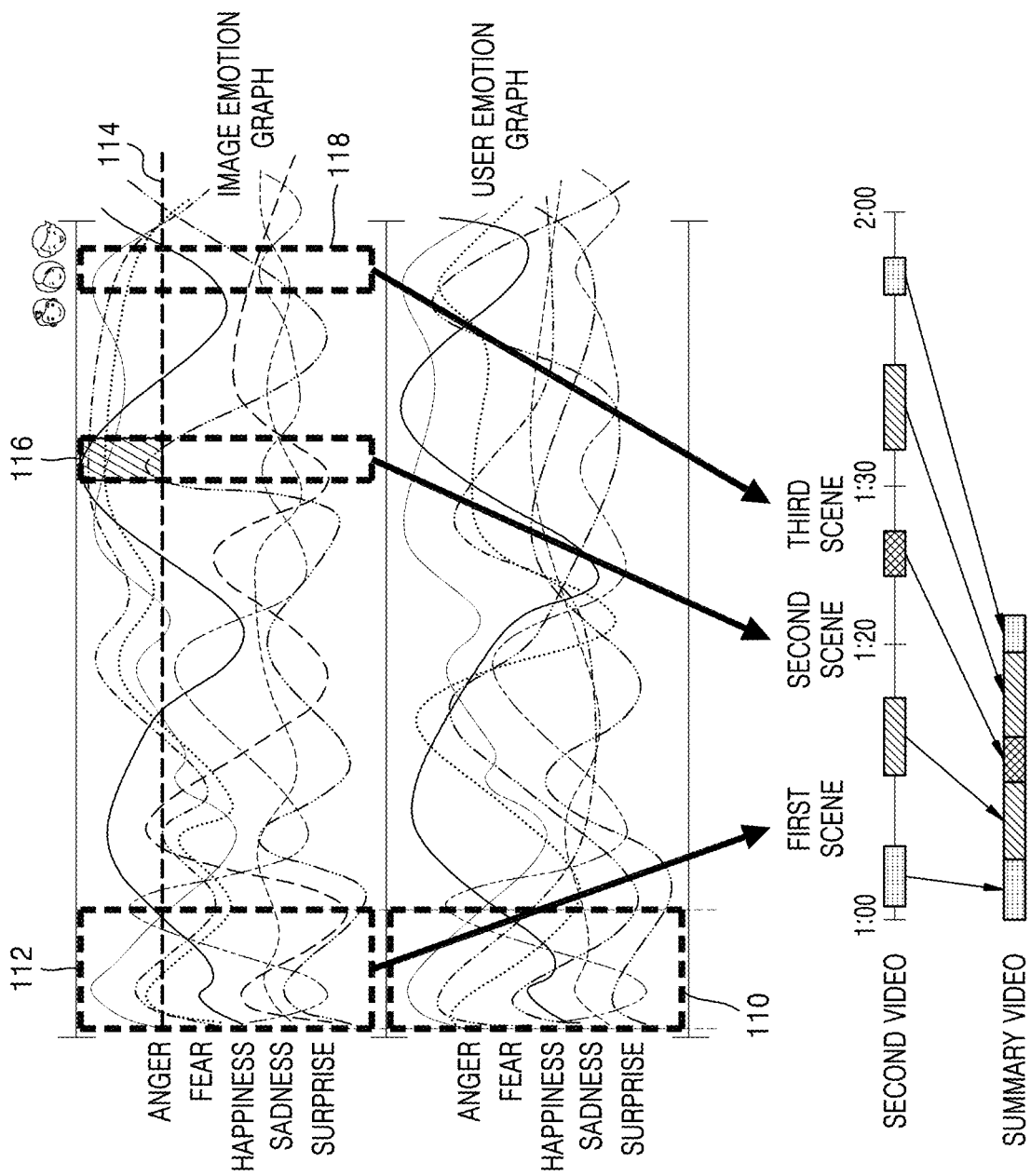
FIG. 11 illustrates an example in which a device selects scenes to be included in a summary video, according to an embodiment of the disclosure.

FIG. 11 illustrates an example in which a device selects scenes to be included in a summary video, according to an embodiment of the disclosure.

Referring to FIG. 11, the device 1000 may select scenes to be included in the summary video among the scenes of the second video.

The device 1000 may compare the user emotion graph with the image emotion graph and select a scene to be included in the summary video from among the scenes of the second video. For example, the device 1000 may select a part 110 corresponding to frames corresponding to a scene of interest of a user who watched the first video in the user emotion graph. The device 1000 may compare emotion curves in the part 110 selected in the user emotion graph with the image emotion graph for the second video. For example, the device 1000 may determine whether emotion curves in the part 110 selected from the user emotion graph are similar with emotion curves in the image emotion graph, and select a part 112, which is similar to the part 110 selected in the user emotion graph, in the image emotion graph. Whether the emotion curves in the part 110 of the user emotion graph are similar with the emotion curves in the part 112 of the image emotion graph may be determined, for example, based on peak values of emotions. However, the disclosure is not limited thereto, and whether the emotion curves are similar may be determined, for example, based on a slope change of the emotion curves, types and the number of peak values exceeding a certain threshold value, etc. The device 1000 may select the first scene corresponding to the part 112 selected in the image emotion graph as the scene to be included in the summary video.

The device 1000 may select the scene to be included in the summary video from among the scenes of the second video, based on the number of emotion scores exceeding a certain threshold value in the image emotion graph. For example, the device 1000 may identify a frame section 116 including four or more emotions having scores greater than or equal to a threshold value 114 and select a second scene corresponding to the identified frame section 116 as the scene to be included in the summary video. However, a criterion for selecting a scene may not be limited thereto, and when the device 1000 selects a scene based on a score of a particular emotion, a magnitude of a threshold value and the number of emotions having a score greater than the threshold value may be set variously.

The device 1000 may determine a scene in which important characters appear many times as a main scene among the scenes of the second video. The device 1000 may select a third scene including frames 118 in which many main characters appear as the scene to be included in the summary video.

Thereafter, the device 1000 may generate the summary video of the second video by connecting frames corresponding to the first scene, frames corresponding to the second scene, and frames corresponding to the third frame.

Figure 12:
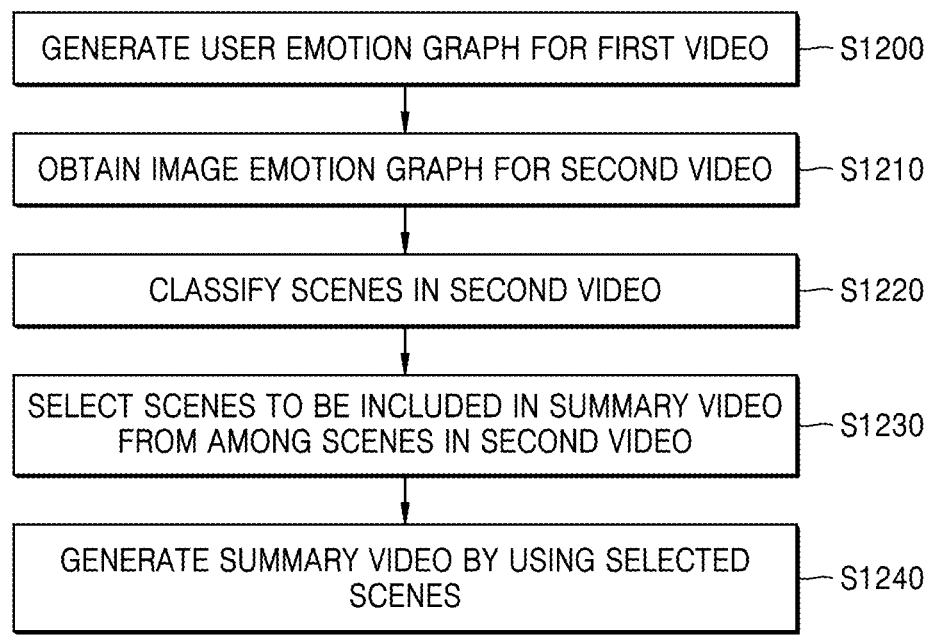
FIG. 12 illustrates a flowchart of a method, performed by a device, for generating a summary video, according to an embodiment of the disclosure.

FIG. 12 illustrates a flowchart of a method, performed by a device, for generating a summary video, according to an embodiment of the disclosure.

In operation S1200, the device 1000 may generate the user emotion graph for the first video. The device 1000 may photograph the user watching the first video while playing the first video and generate the user emotion graph based on a facial expression of the user in a captured image.

For example, the device 1000 may obtain an emotion score of the user for a plurality of emotions by analyzing the facial expression of the user watching an image of a frame for each frame of a video in which the user is photographed. In addition, the device 1000 may generate the user emotion graph for the user watching the first video, by using emotion scores corresponding to the first frame through the nth frame of the video in which the user is photographed. The first frame through the nth frame of the video in which the user is photographed may be consecutive frames, without being limited thereto. For example, the first frame through the nth frame of the video in which the user is photographed may be frames selected at certain intervals among all frames of the video in which the user is photographed. Alternatively, for example, the first frame through the nth frame of the video in which the user is photographed may be frames corresponding to certain scenes among all frames of the video in which the user is photographed.

In operation S1210, the device 1000 may obtain the image emotion graph for the second video. The device 1000 may generate the image emotion graph for the second video, by using a character emotion score, an object emotion score, a background emotion score, a sound emotion score, and a line emotion score which are calculated for the frame or the scene of the second video. The device 1000 may generate the image emotion graph for the second video, by using a character emotion graph, an object emotion graph, a background emotion graph, a sound emotion graph, and a line emotion graph which are calculated for the frame or the scene of the second video. For example, the device 1000 may calculate an emotion score for each frame, by multiplying the character emotion score, the object emotion score, the background emotion score, the sound emotion score, and the line emotion score by the different weight values and summing the weight value-multiplied scores for each frame. The device 1000 may generate the image emotion graph for the second video, by using the emotion score calculated for each frame. The device 1000 may select some of the object emotion score, the background emotion score, the sound emotion score, and the line emotion score obtained for each frame of the second video, and generate the image emotion graph for the second video by using the selected some and the character emotion score obtained for each frame of the second video.

Meanwhile, generation of the image emotion graph may be performed by a server (not shown) instead of the device 1000. In this case, the device 1000 may receive the image emotion graph for the second video from the server (not shown).

In operation S1220, the device 1000 may classify the scenes in the second video. The device 1000 may identify a character in a frame for each frame of the second video and group frames of the second video based on the identified character to classify the scenes in the second video.

The device 1000 may identify an object and a background in a frame for each frame of the second video and group the frames of the second video based on the identified object and background to classify the scenes in the second video.

The device 1000 may classify the scenes in the second video by grouping frames having the same background music based on background music corresponding to a frame of the second video.

The device 1000 may determine an importance of characters appearing in the second video. The device 1000 may identify characters in a frame for each frame of the second video, count the number of times each of the characters is included in the frames of the second video, and determine the importance of the characters based on the counted number. For example, the device 1000 may determine the character A as a main actor based on the number of times each character appears in the second video.

In operation S1230, the device 1000 may select scenes to be included in the summary video among the scenes of the second video. The device 1000 may select a scene including a particular emotion having a score exceeding a certain threshold value from among the scenes of the second video, when the score of the particular emotion exceeds the certain threshold value in the image emotion graph. In this case, when the device 1000 selects a scene based on a score of a particular emotion, a magnitude of a threshold value and the number of emotions having a score greater than the threshold value may be set variously.

The device 1000 may also compare the user emotion graph with the image emotion graph and select a scene to be included in the summary video from among the scenes of the second video. For example, the device 1000 may calculate a similarity between emotion curves of a part of interest of the user in the user emotion graph and emotion curves in the image emotion graph and select a scene corresponding to a part of the image emotion graph having a similarity greater than or equal to a certain threshold value as the scene to be included in the summary video.

The device 1000 may also select the scene to be included in the summary video, based on a peak value of emotions in a part corresponding to a particular scene in the image emotion graph and a peak value of emotions in a particular part in the user emotion graph.

The device 1000 may determine a scene in which characters that are important appear many times as a main scene among the scenes of the second video. For example, the device 1000 may determine as a main scene, a scene in which characters having an importance value that is greater than or equal to a certain threshold value appear a number of times greater than or equal to a certain threshold value. The device 1000 may select a scene, determined as the main scene, as the scene to be included in the summary video.

In operation S1240, the device 1000 may generate the summary video by using the selected scenes. The device

1000 may obtain the frames corresponding to the selected scenes from the second video and connect the obtained frames to generate the summary video.

Figure 13:
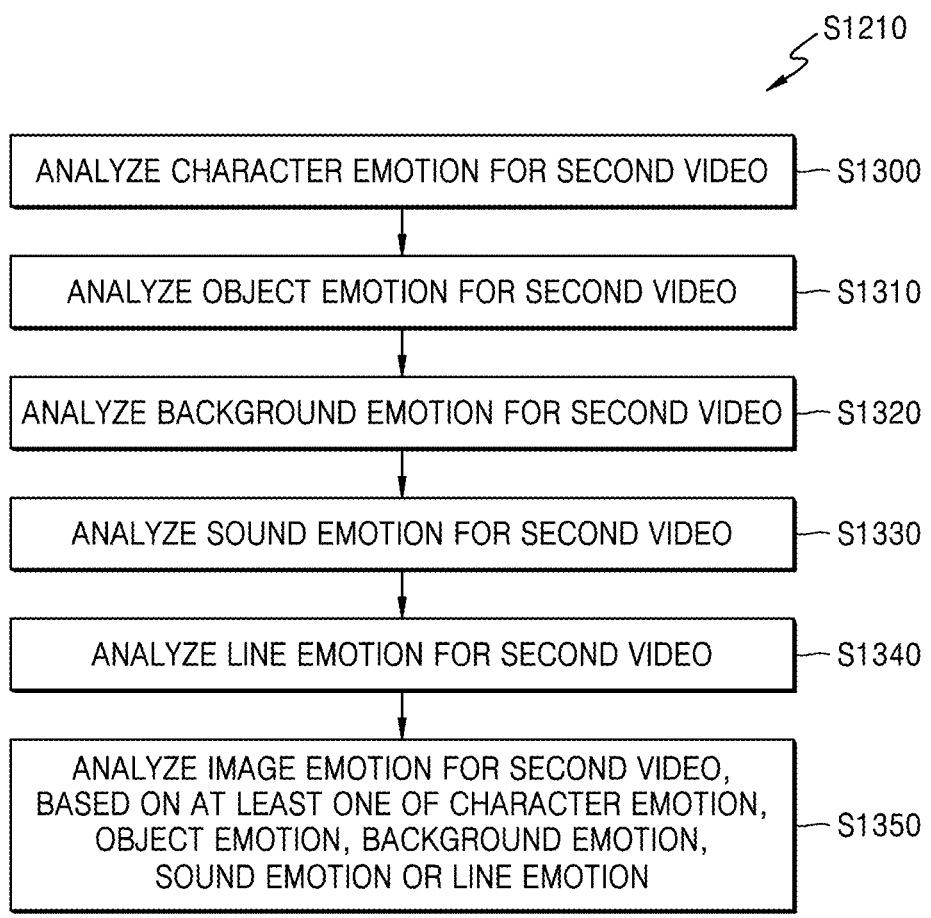
FIG. 13 illustrates a flowchart of a method, performed by a device, for generating an image emotion graph, according to an embodiment of the disclosure.

FIG. 13 illustrates a flowchart of a method of the operation S1210, performed by a device, for generating an image emotion graph, according to an embodiment of the disclosure.

In operation S1300, the device 1000 may analyze a character emotion for the second video. The device 1000 may analyze an emotion of each character in the second video. The device 1000 may obtain character emotion scores for each frame in the second video by analyzing a facial expression of each character in a frame for each frame of the second video. The device 1000 may obtain emotion scores of a character for each frame of the second video, by using an AI model for analyzing an emotion of a character in a video. The device 1000 may input the frames of the second video to the AI model that may output emotion scores of characters in a frame for each frame of the second video. The device 1000 may generate the character emotion graph for the second video, by using emotion scores output from the AI model for each frame of the second video.

Meanwhile, calculation of the character emotion score and generation of the character emotion graph may be performed by the server (not shown) instead of the device 1000. In this case, the device 1000 may receive the character emotion score and/or the character emotion graph for the second video from the server (not shown).

In operation S1310, the device 1000 may analyze object emotions for the second video. The device 1000 may obtain object emotion information related to at least one object and extract an object emotion score of an object appearing in the second video from the object emotion information. The device 1000 may identify an object in a frame of the second video for each frame of the second video, and extract an object emotion score of an object of the same type as the identified object from the object emotion information. In the same manner, the device 1000 may also calculate the object emotion scores for the first frame through the nth frame of the second video and generate the object emotion graph for the second video based on the calculated object emotion scores.

Meanwhile, calculation of the object emotion score and generation of the object emotion graph may be performed by the server (not shown) instead of the device 1000. In this case, the device 1000 may receive the object emotion score and/or the object emotion graph for the second video from the server (not shown).

In operation S1320, the device 1000 may analyze background emotions for the second video. The device 1000 may obtain background emotion information related to at least one background and extract a background emotion score of a background appearing in the second video from the background emotion information. The device 1000 may identify a background in a frame for each frame of the second video for the frame or the scene, and extract a background emotion score of a background of the same type as the identified object from the background emotion information. In the same manner, the processor 1600 may also calculate the background emotion scores for the first frame through the nth frame of the second video and generate the background emotion graph for the second video based on the calculated background emotion scores.

Meanwhile, calculation of the background emotion score and generation of the background emotion graph may be performed by the server (not shown) instead of the device 1000. In this case, the device 1000 may receive the background emotion score and/or the background emotion graph for the second video from the server (not shown).

In operation S1330, the device 1000 may analyze sound emotions for the second video. The device 1000 may obtain sound emotion information related to at least one sound and extract a sound emotion score related to a sound output from the second video from the sound emotion information. The device 1000 may identify a sound corresponding to a frame for each frame of the second video, and extract a sound emotion score regarding a sound recognized as being the same as the identified sound from the sound emotion information. In the same manner, the processor 1600 may also calculate the sound emotion scores for the first frame through the nth frame of the second video and generate the sound emotion graph for the second video based on the calculated sound emotion scores.

Meanwhile, calculation of the sound emotion score and generation of the sound emotion graph may be performed by the server (not shown) instead of the device 1000. In this case, the device 1000 may receive the sound emotion score and/or the sound emotion graph for the second video from the server (not shown).

In operation S1340, the device 1000 may analyze line emotions for the second video. The device 1000 may calculate a line emotion score for the second video based on words included in a line of characters in the second video. In this case, the device 1000 may previously store line emotion information related to at least one line, extract line emotion scores related to lines included in the second video from the line emotion information, and generate a line emotion graph for the second video based on the extracted line emotion scores.

Meanwhile, calculation of the line emotion score and generation of the line emotion graph may be performed by the server (not shown) instead of the device 1000. In this case, the device 1000 may receive the line emotion score and/or the line emotion graph for the second video from the server (not shown).

In operation S1350, the device 1000 may analyze image emotions for the second video based on at least one of character emotions, object emotions, background emotions, sound emotions, or line emotions. The device 1000 may generate the image emotion graph for the second video, by using a character emotion score, an object emotion score, a background emotion score, a sound emotion score, and a line emotion score which are calculated for each frame of the second video. The device 1000 may generate the image emotion graph for the second video, by using a character emotion graph, an object emotion graph, a background emotion graph, a sound emotion graph, and a line emotion graph which are calculated for each frame of the second video.

The device 1000 may generate the image emotion graph for the second video, by applying different weight values to the character emotion score, the object emotion score, the background emotion score, the sound emotion score, and the line emotion score which are calculated for each frame of the second video. For example, the device 1000 may calculate an emotion score for each frame, by multiplying the character emotion score, the object emotion score, the background emotion score, the sound emotion score, and the line emotion score by the different weight values and summing the weight value-multiplied scores for each frame. The device 1000 may generate the image emotion graph for the second video, by using the emotion score calculated for each frame.

The device 1000 may select some of the object emotion score, the background emotion score, the sound emotion score, and the line emotion score obtained for each frame of the second video, and generate the image emotion graph for the second video by using the selected some and the character emotion score obtained for each frame of the second video.

Meanwhile, generation of the image emotion graph may be performed by a server (not shown) instead of the device 1000. In this case, the device 1000 may receive the image emotion graph for the second video from the server (not shown).

An embodiment of the disclosure may be implemented using a recording medium including a computer-executable instruction such as a computer-executable programming module. A computer-readable recording medium may be an available medium that is accessible by a computer, and includes all of a volatile medium, a non-volatile medium, a separated medium, and a non-separated medium. The computer-readable recording medium may also include a computer storage medium and a communication medium. The computer storage medium includes all of a volatile medium, a non-volatile medium, a separated medium, and a non-separated medium, which is implemented by a method or technique for storing information such as a computer-readable instruction, a data structure, a programming module, or other data. A communication medium may typically include a computer-readable instruction, a data structure, or other data of a modulated data signal such as a programming module.

In addition, the computer-readable storage medium may be provided in the form of a non-transitory storage medium. Wherein, the term 'non-transitory storage medium' simply means that the storage medium is a tangible device, and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. When distributed online, at least a part of the computer program product (e.g., a downloadable app) may be temporarily generated or at least temporarily stored in the machine-readable storage medium, such as memory of the manufacturer's server, a server of the application store, or a relay server.

In the specification, the term "unit" may be a hardware component like a processor or a circuit, and/or a software component executed by a hardware component like a processor.

Herein, when "at least one of a, b, or c is included", it may mean that "only a is included, only b is included, only c is included, a and b are included, b and c are included, a and c are included, or all of a, b, and c are included".

A function related to artificial intelligence (AI) according to the disclosure is performed through a processor and a memory. The processor may include one processor or a plurality of processors. In this case, one processor or a plurality of processors may include a general-purpose processor such as a central processing unit (CPU), an application processor (AP), a digital signal processor (DSP), etc., a graphic-dedicated processor such as a graphic processing unit (GPU), a vision processing unit (VPU), etc., and an AI-dedicated processor such as a neural processing Unit (NPU). One processor or a plurality of processors may control data to be processed according to a predefined operation rule or AI model stored in the memory. When one processor or a plurality of processors include an AI-dedicated processor, the AI-dedicated processor may be designed as a hardware structure specialized for processing a specific AI model.

The predefined operation rule or AI model may be made through training. Herein, when the AI model is made through training, it may mean that a basic AI model is trained based on a learning algorithm by using multiple training data, such that the predefined operation rule or AI model set to execute desired characteristics (or purpose) is made. Such training may be performed by a device on which AI according to the disclosure is implemented, or by a separate server and/or system. Examples of a learning algorithm may include, but are not limited to, supervised learning, unsupervised learning, semi-supervised learning, or reinforcement learning.

The AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be modified to reduce or minimize a loss value or a cost value obtained in the AI model during a training process. Examples of the AI neural network may include, but not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

The AI model according to the disclosure may output an image or output data obtained by recognizing an object in the image, by using image data as input data to the AI model. The AI model may be made through training. Herein, when the AI model is made through training, it may mean that a basic AI model is trained based on a learning algorithm by using multiple training data, such that the predefined operation rule or AI model set to execute desired characteristics (or purpose) is made. The AI model may include a plurality of neural network layers. Each of the plurality of neural network layers may have a plurality of weight values, and perform a neural network operation through an operation between an operation result of a previous layer and the plurality of weight values.

Visual understanding refers to a technique for recognizing and processing an object like human vision, and may include object recognition, object tracking, image retrieval, human recognition, scene recognition, 3D reconstruction/localization, image enhancement, etc.

Those of ordinary skill in the art to which the disclosure pertains will appreciate that the disclosure may be implemented in different detailed ways without departing from the technical spirit or essential characteristics of the disclosure. Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the disclosure is defined by the following claims rather than the detailed description, and the meanings and scope of the claims and all changes or modified forms derived from their equivalents should be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a device, of generating a summary video, the method comprising:
   obtaining a user image in which a user watching a first video is photographed, during playback of the first video;
   generating a user emotion graph of the user watching the first video, by analyzing an emotion of the user in the obtained user image;
   obtaining a character emotion graph for a second video, by analyzing an emotion of a character in the second video that is a target of summarization;
   obtaining an object emotion graph for an object in the second video, based on an object emotion information indicating emotions of characters for the object, wherein the object emotion information is received from a server;
   obtaining an image emotion graph for the second video, by combining character emotion scores and object emotion scores for each frame of the second video in the character emotion graph and the object emotion graph, wherein the character emotion scores are obtained by analyzing a facial expression of the characters and the object emotion scores are obtained based on emotion scores of characters for the object;
   selecting at least one first scene in the second video by the user emotion graph of the user that watched the first video with the image emotion graph for the second video; and
   generating the summary video of the second video, based on the at least one first scene.

2. The method of claim 1, further comprising:
   selecting at least one second scene in the second video, based on emotion scores in the image emotion graph,
   wherein the generating of the summary video comprises generating the summary video of the second video, based on the at least one first scene and the at least one second scene.

3. The method of claim 2, wherein selecting the at least one first scene comprises:
   selecting a first part of the image emotion graph by comparing a slope of emotion curves in the user emotion graph with a slope of emotion curves in the image emotion graph, and
   selecting a scene corresponding to the selected first part as the at least one first scene to be included in the summary video.

4. The method of claim 2, wherein selecting the at least one second scene comprises:
   selecting a second part comprising an emotion score greater than a certain threshold value when an emotion score of at least one preset emotion in the image emotion graph is greater than the certain threshold value, and
   selecting a scene corresponding to the selected second part as the at least one second scene to be included in the summary video.

5. The method of claim 2, wherein generating the summary video comprises combining frames corresponding to the at least one first scene with frames corresponding to the at least one second scene.

6. The method of claim 1, wherein the user emotion graph is generated based on a user emotion score calculated based on at least one of a facial expression or a voice of the user watching the first video.

7. The method of claim 1, wherein:
   the character emotion graph is generated based on the character emotion score calculated for a frame or a scene of the second video, and
   obtaining the character emotion graph comprises calculating the character emotion score for a frame or a scene of the second video, by applying different weight values to characters in the second video.

8. The method of claim 1, wherein obtaining the object emotion graph comprises:
   obtaining the object emotion information based on at least one of a facial expression, a voice, or a line of a character at a time of appearance of the object in at least one third video;
   calculating the object emotion scores for the object appearing in the second video for a frame or a scene of the second video, based on the obtained object emotion information; and
   generating an object emotion graph for the second video, based on the calculated object emotion scores.

9. The method of claim 1, further comprising:
   identifying a sound for a frame or a scene in the second video; and
   obtaining a sound emotion graph for a sound output from the second video, based on the identified sound,
   wherein obtaining the image emotion graph comprises obtaining the image emotion graph for the second video, based on the character emotion graph, the object emotion graph, and the sound emotion graph.

10. The method of claim 9, further comprising:
    identifying a line for a frame or a scene in the second video; and
    obtaining a line emotion graph for a line output from the second video, based on the identified line,
    wherein obtaining the image emotion graph comprises obtaining the image emotion graph for the second video, based on the character emotion graph, the object emotion graph, the sound emotion graph, and the line emotion graph.

11. A device for generating a summary video, the device comprising:
    a communication interface;
    a display;
    a memory storing one or more instructions; and
    a processor configured to:
       obtain a user image in which a user watching a first video is photographed, during playback of the first video through the display,
       generate a user emotion graph of the user watching the first video, by analyzing an emotion of the user in the obtained user image, obtain a character emotion graph for a second video, by analyzing an emotion of a character in the second video that is a target of summarization, obtain an object emotion graph for an object in the second video, based an object emotion information indicating emotions of characters for the object, wherein the object emotion information is received from a server, obtain an image emotion graph for the second video, by combining character emotion scores and object emotion scores for each frame of the second video in the character emotion graph and the object emotion graph, wherein the character emotion scores are obtained by analyzing a facial expression of the characters and the object emotion scores are obtained based on emotion scores of characters for the object, select at least one first scene in the second video by comparing the user emotion graph of the user that watched the first video with the image emotion graph for the second video, and generate the summary video of the second video, based on the at least one first scene.

12. The device of claim 11, wherein the processor is further configured to:
select at least one second scene in the second video based on emotion scores in the image emotion graph; and
generate the summary video of the second video based on the at least one first scene and the at least one second scene.

13. The device of claim 12, wherein the processor is further configured to:
select a first part of the image emotion graph by comparing a slope of emotion curves in the user emotion graph with a slope of emotion curves in the image emotion graph; and
select a scene corresponding to the selected first part as the at least one first scene to be included in the summary video.

14. The device of claim 12, wherein the processor is further configured to:
select a second part including an emotion score greater than a certain threshold value when an emotion score of at least one preset emotion in the image emotion graph is greater than the certain threshold value; and
select a scene corresponding to the selected second part as the at least one second scene to be included in the summary video.

15. The device of claim 12, wherein to generate the summary video, the processor is further configured to combine frames corresponding to the at least one first scene with frames corresponding to the at least one second scene.

16. The device of claim 11, wherein the user emotion graph is generated based on a user emotion score calculated based on at least one of a facial expression or a voice of the user watching the first video.

17. The device of claim 11, wherein:
the character emotion graph is generated based on the character emotion scores calculated for a frame or a scene of the second video, and
the processor is further configured to: calculate the character emotion scores for a frame or a scene of the second video, by applying different weight values to characters in the second video.

18. The device of claim 11, wherein the processor is further configured to:
obtain the object emotion information based on at least one of a facial expression, a voice, or a line of a character at a time of appearance of the object in at least one third video,
calculate the object emotion scores for the object appearing in the second video for a frame or a scene of the second video, based on the obtained object emotion information, and
generate an object emotion graph for the second video, based on the calculated object emotion scores.

19. The device of claim 11, wherein the processor is further configured to:
identify a sound for a frame or a scene in the second video; and
obtain a sound emotion graph for a sound output from the second video, based on the identified sound,
wherein the image emotion graph for the second video is obtained, based on the character emotion graph, the object emotion graph, and the sound emotion graph.

20. A non-transitory computer-readable recording medium embodying a program, the program comprising computer readable program code that when executed by a processor of an electronic device, causes the processor to:
obtain a user image in which a user watching a first video is photographed, during playback of the first video through a display,
generate a user emotion graph of the user watching the first video, by analyzing an emotion of the user in the obtained user image,
obtain a character emotion graph for a second video, by analyzing an emotion of a character in the second video that is a target of summarization,
obtain an object emotion graph for an object in the second video, based on an object emotion information indicating emotions of characters for the object, wherein the object emotion information is received from a server,
obtain an image emotion graph for the second video, by combining character emotion scores and object emotion scores for each frame of the second video in the character emotion graph and the object emotion graph, wherein the character emotion scores are obtained by analyzing a facial expression of the characters and the object emotion scores are obtained based on emotion scores of characters for the object,
select at least one first scene in the second video by comparing the user emotion graph with the image emotion graph of the user that watched the first video for the second video, and
generate a summary video of the second video, based on the at least one first scene.

\* \* \* \* \*